United States Patent
Rama et al.

(10) Patent No.: US 12,136,227 B2
(45) Date of Patent: Nov. 5, 2024

(54) COMMUNICATION SUPPORT DEVICE, COMMUNICATION SUPPORT METHOD, AND COMPUTER-READABLE STORAGE MEDIUM INCLUDING PROGRAM

(71) Applicant: OMRON Corporation, Kyoto-shi (JP)

(72) Inventors: Endri Rama, Kyoto (JP); Kazuo Yamamoto, Nara-shi (JP); Tomohiro Yabuuchi, Kyoto-shi (JP); Naoto Iwamoto, Higashiosaka-shi (JP)

(73) Assignee: OMRON CORPORATION, Kyoto (JP)

( * ) Notice: Subject to any disclaimer, the term of this patent is extended or adjusted under 35 U.S.C. 154(b) by 610 days.

(21) Appl. No.: 17/391,624

(22) Filed: Aug. 2, 2021

(65) Prior Publication Data

US 2022/0036566 A1    Feb. 3, 2022

(30) Foreign Application Priority Data

Aug. 3, 2020 (JP) .................................. 2020-131398

(51) Int. Cl.
| | |
|---|---|
| *G06T 7/246* | (2017.01) |
| *A61H 3/06* | (2006.01) |
| *G06F 18/22* | (2023.01) |
| *G06T 7/50* | (2017.01) |
| *G06T 7/70* | (2017.01) |

(Continued)

(52) U.S. Cl.
CPC ............ *G06T 7/246* (2017.01); *A61H 3/061* (2013.01); *G06F 18/22* (2023.01); *G06T 7/50* (2017.01); *G06T 7/70* (2017.01); *G06V 20/58* (2022.01); *G06V 40/174* (2022.01); *A61H 2201/5092* (2013.01); *G06V 2201/07* (2022.01)

(58) Field of Classification Search
CPC ... G06T 7/246; G06T 7/50; G06T 7/70; G06F 18/22

See application file for complete search history.

(56) References Cited

FOREIGN PATENT DOCUMENTS

| CN | 108836769 A | 11/2018 |
|---|---|---|
| JP | 2013037390 A | 2/2013 |
| JP | 2017127491 A | 7/2017 |

(Continued)

OTHER PUBLICATIONS

JPO Notice of Reasons for Refusal for corresponding JP Application No. 2020-131398; Dated Jan. 16, 2024; 8 pages.

*Primary Examiner* — Myron Wyche
(74) *Attorney, Agent, or Firm* — CANTOR COLBURN LLP

(57) ABSTRACT

The communication support device comprises an imaging unit, a counterpart detector, a priority level setting unit, a priority determination unit, and a notification unit. The imaging unit that captures an image of a surrounding environment of a user to acquire a captured image. The counterpart detector detects a plurality of predetermined counterparts in the captured image. The a priority level setting unit sets priority levels respectively for the plurality of counterparts based on a predetermined relationship between the user and each of the plurality of counterparts. The priority determination unit determines priorities of the plurality of counterparts based on the priority levels. The notification unit selects information regarding the plurality of counterparts based on the priorities and notifies the user of the selected information.

15 Claims, 26 Drawing Sheets

(51) Int. Cl.
*G06V 20/58* (2022.01)
*G06V 40/16* (2022.01)

(56) References Cited

FOREIGN PATENT DOCUMENTS

| JP | 2018152953 | * | 3/2019 | ............... | G06F 3/01 |
| JP | 2019152953 | * | 3/2019 | ............... | G06F 3/01 |
| JP | 2019152953 A | | 9/2019 | | |

* cited by examiner

Fig.3
| ID | IMAGE | NAME | ADDRESS | TEL | E-MAIL | BIRTHDAY | RELATIONSHIP COEFFICIENT | PRIORITY LEVEL |
|---|---|---|---|---|---|---|---|---|
| 1 |  | A | ... | ... | ... | ... | 1 | 1 |
| 2 |  | B | ... | ... | ... | ... | 0.75 | 0.75 |
| 3 |  | C | ... | ... | ... | ... | 0.5 | 0.5 |
| 4 |  | D | ... | ... | ... | ... | 0.4 | 1.4 |
| 5 |  | E | ... | ... | ... | ... | 0.3 | 0.3 |
| 6 |  | ROBOT 1 | ... | ... | ... | ... | 0.3 | 0.3 |
51

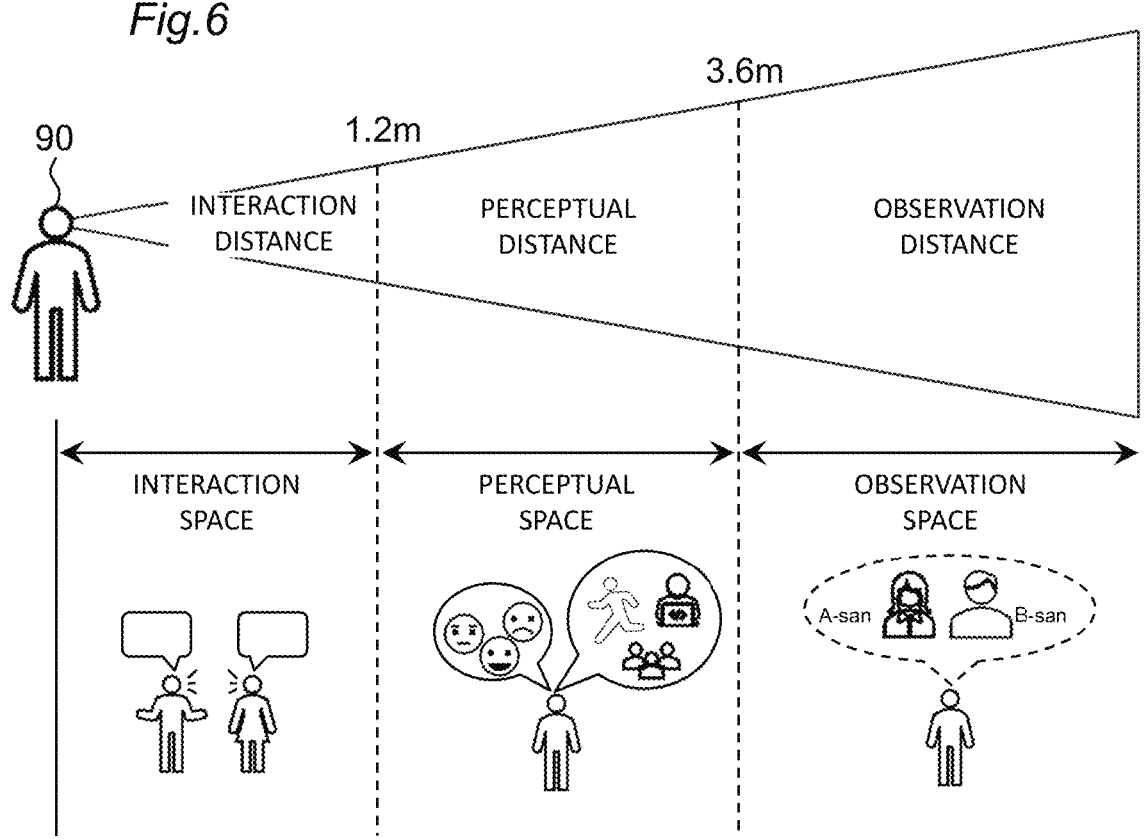

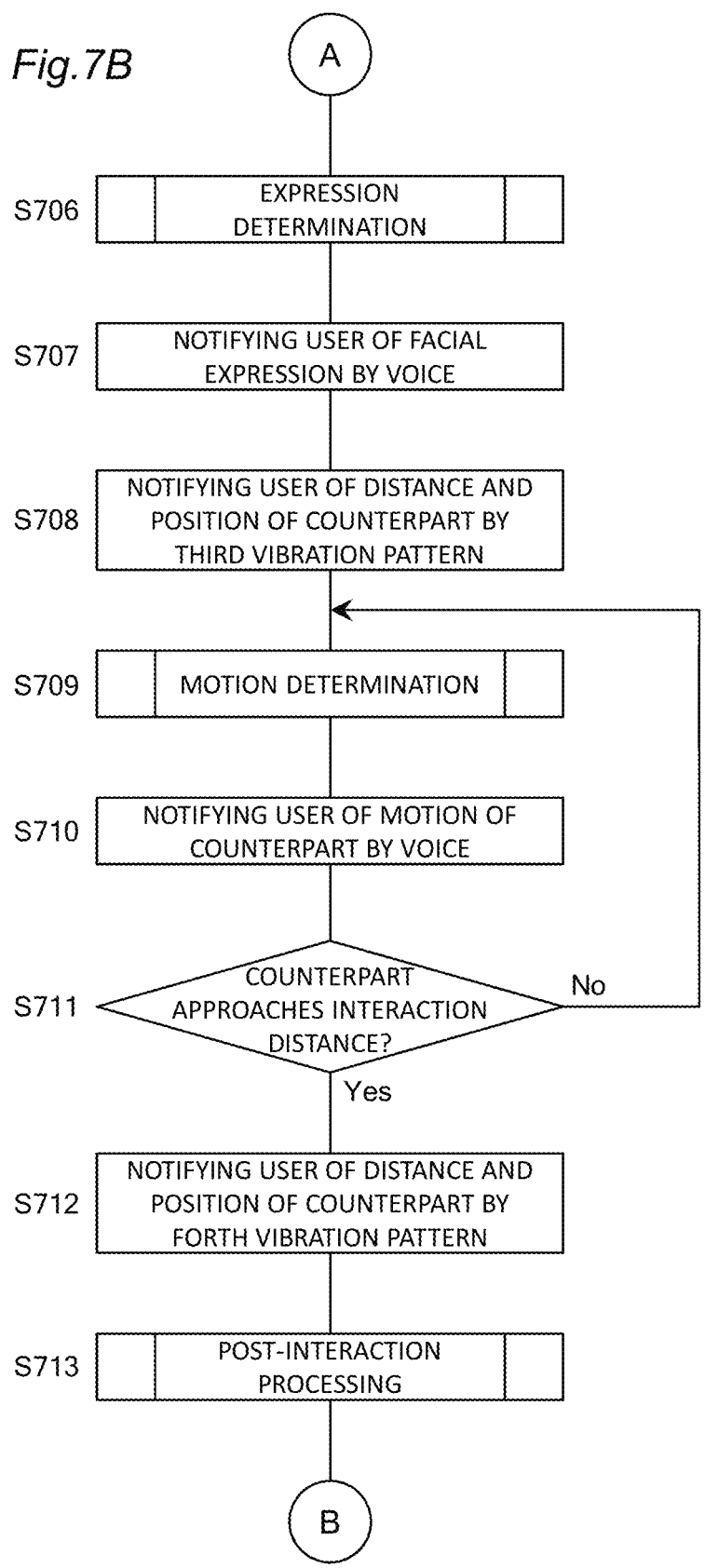

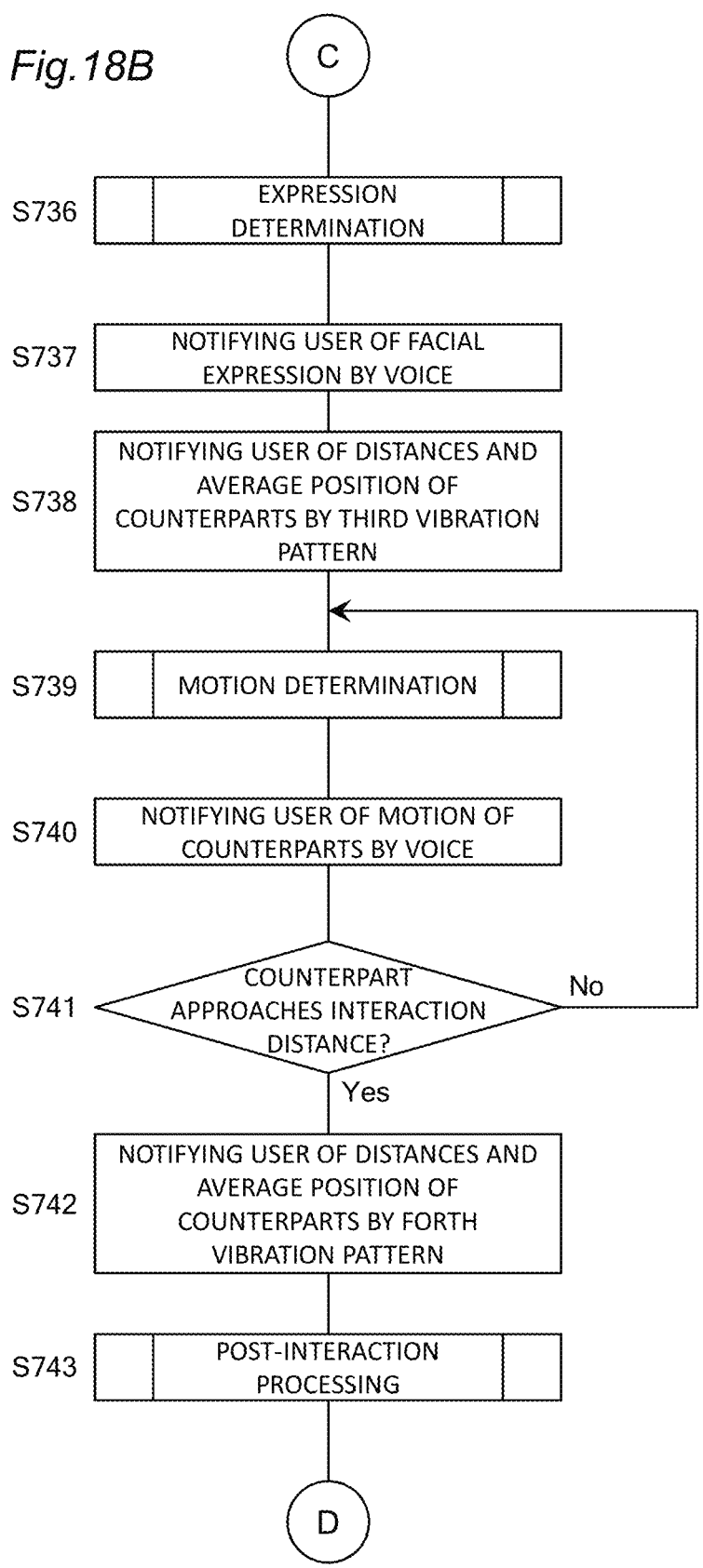

COMMUNICATION SUPPORT DEVICE, COMMUNICATION SUPPORT METHOD, AND COMPUTER-READABLE STORAGE MEDIUM INCLUDING PROGRAM

CROSS REFERENCE TO RELATED APPLICATIONS

The present invention claims priority under 35 U.S.C. § 119 to Japanese Application No. 2020-131398 filed Aug. 3, 2020, the entire content of which is incorporated herein by reference.

TECHNICAL FIELD

The present disclosure relates to a communication support device, a communication support method, and a computer-readable storage medium including a program.

BACKGROUND ART

Chinese Patent Application Publication No. 108836769 discloses a device and a method for assisting movement of a visually impaired person. This device acquires an image by a visual sensor of an obstacle detection module, detects a person, an obstacle, and the like in the image by image analysis, and performs feedback by a voice.

In a case where a plurality of counterparts such as acquaintances are present around a user, it takes time or causes confusion to the user if information regarding all the counterparts is transmitted to the user, so that it is difficult to expect smooth communication.

SUMMARY

An object of the present disclosure is to provide a communication support device that supports a user to smoothly communicate with at least one of a plurality of counterparts in a case where the plurality of counterparts are present in the periphery.

A communication support device according to an aspect of the present disclosure includes: an imaging unit that captures an image of a surrounding environment of a user to acquire a captured image; a counterpart detector that detects a plurality of predetermined counterparts in the captured image; a priority level setting unit that sets priority levels respectively for the plurality of counterparts based on a predetermined relationship between the user and each of the plurality of counterparts; and a priority determination unit that determines priorities of the plurality of counterparts based on the priority levels; and a notification unit that selects information regarding the plurality of counterparts based on the priorities and notifies the user of the selected information.

A communication support device according to the present disclosure enables the user to smoothly communicate with at least one of the plurality of counterparts even in the case where the plurality of counterparts are present in the periphery.

BRIEF DESCRIPTION OF THE DRAWINGS

FIG. 3 is a schematic view illustrating an example of a counterpart database illustrated in FIG. 2.

FIG. 6 is a schematic view for describing an example of a spatial distance.

FIG. 7B is a flowchart illustrating a detailed flow of the long distance flow illustrated in FIG. 5.

FIG. 18B is a flowchart illustrating a detailed flow of the long distance flow illustrated in FIG. 17.

DETAILED DESCRIPTION

Hereinafter, embodiments of a communication support device according to the present disclosure will be described with reference to the accompanying drawings. Note that, the same components are denoted by the same reference signs in each of the following embodiments.

1. APPLICATION EXAMPLE

Figure 1:
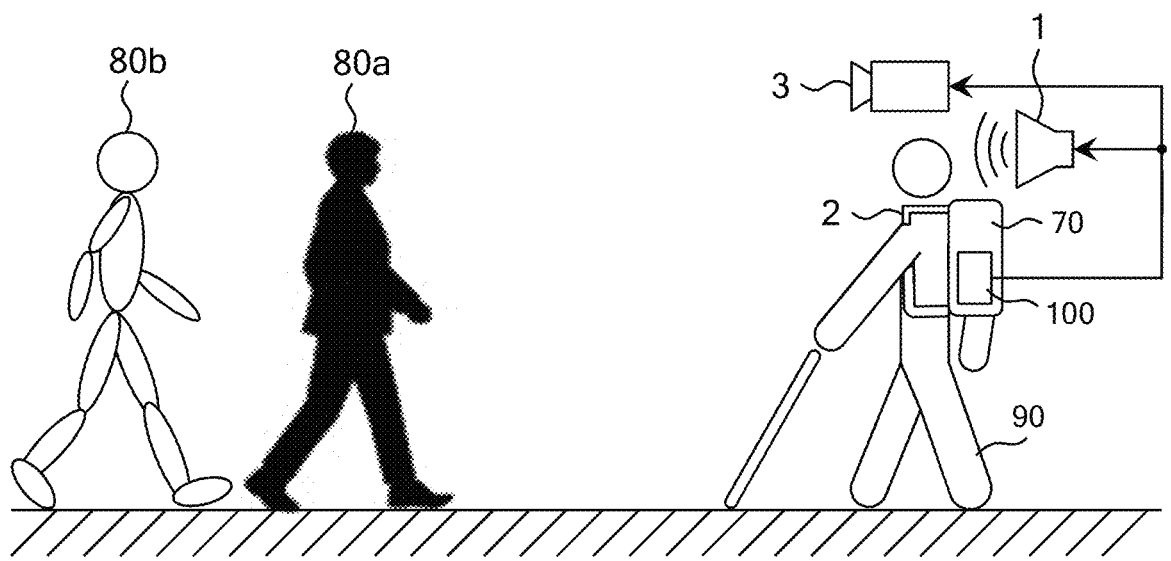
FIG. 1 is a schematic view illustrating an application example of a communication support device according to the embodiment.

FIG. 1 is a schematic view illustrating an application example of a communication support device 100 according to the embodiment. The communication support device 100 provides communication support to, for example, a user 90 who is a visually impaired person. It is difficult for the visually impaired person to visually perceive a figure, a face, and the like even if counterparts 80a and 80b such as acquaintances approach. Therefore, it is difficult to recognize names, facial expressions, motions, and the like of the counterparts 80a and 80b. Therefore, there is a case where the user 90 is not capable of taking a motion such as greeting the counterparts 80a and 80b even if the counterparts 80a and 80b approach.

Therefore, the communication support device 100, for example, captures an image of the surroundings with a camera 3, analyzes a captured image to detect the counterparts 80a and 80b, and outputs identification information such as names of the counterparts 80a and 80b and information such as positions, distances, facial expressions, and motions to notify the user 90. The communication support device 100 can execute personal recognition while the user 90 is taking a motion (for example, walking) and/or is stopped (is not taking any motion).

The communication support device 100 is mounted on a luggage such as a rucksack 70 of a user 90, for example. Alternatively, the communication support device 100 itself may be wearable. Information about positions of the counterparts 80a and 80b and each distance between each of the counterparts 80a and 80b and the user 90 can be notified to the user 90 by a vibration using a vibration unit 2. Meanwhile, the user 90 is notified of the identification information, such as names, facial expressions, and motions of the counterparts 80a and 80b, for example, by a voice using a voice output unit 1 such as a speaker.

The notification of information by the voice is to read the information, and it takes a certain amount of time to transmit the information to the user 90. Therefore, in a case where the distance between the user 90 and each of the counterparts 80a and 80b is short, the user 90 is likely to pass the counterparts 80a and 80b during reading if the entire information detected by the communication support device 100 is read. In addition, when there are a plurality of counterparts around the user 90 as in the example illustrated in FIG. 1, that the user 90 is likely to be confused due to a large amount of notified information as well as the user 90 is likely to pass the counterparts 80a and 80b during reading as described above. In this case, it is difficult for the user 90 to communicate smoothly with the counterparts 80a and 80b.

Therefore, for example, the communication support device 100 sets priority levels to the counterparts 80a and 80b, respectively, based on the relationship between the user 90 and each of the counterparts 80a and 80b. The communication support device 100 determines priorities of the counterparts 80a and 80b based on the priority levels, selects information based on the priorities, and notifies the user 90 of the information. The communication support device 100 can provide the user 90 with appropriate information in an appropriate order by notifying the information based on the priority in this manner. As a result, the user 90 can receive appropriate information regarding the counterparts 80a and 80b, such as acquaintances, in a timely manner, and can naturally communicate with the counterparts.

The communication support device 100 may be mounted on a navigation robot that supports movement of the user 90 by performing air operation such as guiding the user 90 to a destination. Such a navigation robot can support smooth communication of the user 90 in addition to the movement support of the user 90. Such a navigation robot may be a self-propelled robot that supports the movement of the user 90 by, for example, self-propelling and leading the user 90 to a place where the user 90 wants to go. Alternatively, the communication support device 100 may be applied in a case where the user 90 is a robot that can communicate with another person or another robot.

2. CONFIGURATION EXAMPLE

Figure 2:
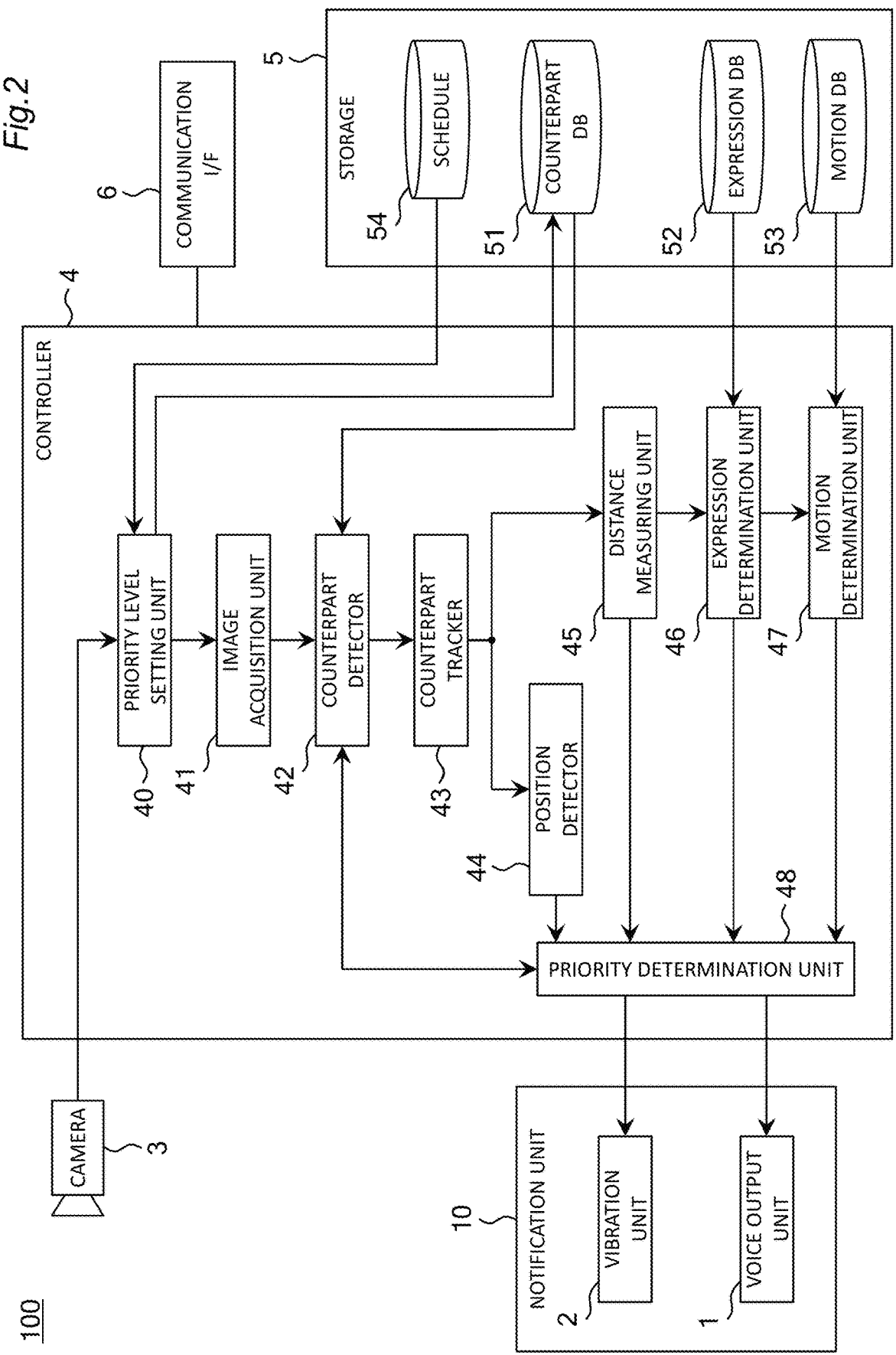
FIG. 2 is a block diagram illustrating a configuration example of the communication support device according to the embodiment.

FIG. 2 is a block diagram illustrating a configuration example of the communication support device 100 according to the embodiment. The communication support device 100 includes the camera 3, a controller 4, a storage 5, a communication interface (I/F) 6, and a notification unit 10.

The camera 3 is an imaging device that captures an image of a surrounding environment of the user 90 to form a captured image. The camera 3 captures an image of the periphery of the user 90 at a preset frame rate, for example, to sequentially generate image data. The camera 3 forms the captured image by, for example, a solid-state imaging element such as a complementary MOS (CMOS) and a charge coupled device (CCD). The camera 3 is, for example, a wearable camera that can be worn by the user 90. For example, the camera 3 is a spectacle-type camera mounted on spectacles, and captures a direction of a line of sight of the user 90. The camera 3 may be mounted on a luggage of the user 90 such as a rucksack and a suitcase.

The controller 4 includes a central processing unit (CPU), a random access memory (RAM), a read only memory (ROM), and the like, and is an information processing device that controls each component of the communication support device 100 according to information processing. The controller 4 includes, for example, a priority level setting unit 40, an image acquisition unit 41, a counterpart detector 42, a counterpart tracker 43, a position detector 44, a distance measuring unit 45, an expression determination unit 46, a motion determination unit 47, and a priority determination unit 48 as components. Processing in charge of each of the components of the controller 4 may be executed as the controller 4 executes a necessary program. Such a program may be stored in the storage 5. When the controller 4 executes a necessary program, a target program stored in the storage 5 is expanded in the RAM. The controller 4 controls each of the components by interpreting and executing the program expanded in the RAM using the CPU. An operation example of each of the components will be described later.

The communication interface 6 includes an interface circuit configured to enable a communication connection between the communication support device 100 and an external device. The communication interface 6 communicates according to standards such as IEEE802.3, IEEE802.11 or (registered trademark), LTE, 3G, 4G, and 5G. The communication interface 6 may be an interface circuit that performs communication according to standards such as universal serial bus (USB), HDMI (registered trademark), IEEE1394, and Bluetooth (registered trademark).

The notification unit 10 is an output device configured to transmit information to the user 90. The notification unit 10 includes, for example, the voice output unit 1 and the vibration unit 2. The voice output unit 1 is, for example, an output device that outputs a voice according to control by the controller 4. The voice output unit 1 includes, for example, audio devices such as a speaker, an earphone, and a headphone. The vibration unit 2 is, for example, a vibrator that generates a vibration according to control by the controller 4.

In the embodiment, an example in which each function of the controller 4 is realized by the CPU will be described. However, some or all of the above functions may be realized by one or more dedicated processors. In addition, regarding the components of the controller 4, the functions may be omitted, replaced, or added as appropriate according to an embodiment. The controller 4 may be formed of various semiconductor integrated circuits such as a CPU, an MPU, a GPU, a microcomputer, a DSP, an FPGA, and an ASIC.

The storage 5 is a computer-readable storage medium that accumulates information such as a program by an electrical, magnetic, optical, mechanical or chemical operation so as to enable reading of information such as the program recorded by a computer or other devices, machine, and the like. The storage 5 is, for example, an auxiliary storage device such as a hard disk drive and a solid state drive. The storage 5 stores, for example, a counterpart database 51, an expression database 52, a motion database 53, a schedule 54, a program executed by the controller 4, and the like. The storage 5 may include a main storage device such as a RAM. The storage of these pieces of data in the storage 5 is merely an example, and these pieces of data may be stored in, for example, an external server with which the communication support device 100 can communicate via the communication interface 6.

FIG. 3 is a schematic view illustrating an example of the counterpart database 51 stored in the storage 5 illustrated in FIG. 2. The counterpart database 51 stores information regarding a counterpart such as an identification number (ID) of the counterpart, an image including a face, a relationship coefficient, a priority level, an address, a telephone number, an e-mail address, and a date of birth. The counterpart is a person who the user 90 wants to communicate with or a person who can communicate with the user 90, and includes, for example, an acquaintance of the user 90, a celebrity, and the like. As the counterpart, not only a person but also an object that can serve as a communication target, such as a robot, may be registered.

Here, the relationship coefficient is, for example, an index indicating the closeness of the relationship between the user 90 and the counterpart. The relationship coefficient is input in advance by the user 90 himself or herself, for example. The relationship coefficient may be determined based on the number of times of meeting between the user 90 and the counterpart, a blood relationship such as a parent, and the like. The relationship coefficient has a higher value as the relationship between the user 90 and the counterpart is closer, for example. The relationship coefficient is represented by, for example, a numerical value between 0 and 1.

In addition, the priority level is an index indicating a level of priority as a communication target for the user 90. The priority level is determined by the priority level setting unit 40 based on, for example, the relationship coefficient and information stored in the schedule 54. For example, a priority level of a counterpart who is scheduled to meet with the user 90 within a predetermined period may be set to be a sum of a relationship coefficient and an event coefficient (for example, 1), and priority levels of the other counterparts may be set to be equal to relationship coefficients. The event coefficient may be represented by a numerical value between 0 and 1 according to an importance level of a schedule of the user 90. In this case, when the relationship coefficient is represented by a numerical value between 0 and 1, the priority level is represented by a numerical value between 0 and 2. The priority level may be normalized to be represented by a numerical value between 0 and 1.

3. OPERATION EXAMPLE

3-1. Overall Flow

The communication support device 100 according to the embodiment notifies the user 90 of a name, a position, a distance, and the like of a counterpart such as an acquaintance to support the user 90 to smoothly communicate with the counterpart. For example, the communication support device 100 supports the user 90 who is a visually impaired person to smoothly communicate with a counterpart such as an acquaintance. Hereinafter, an operation example of the communication support device 100 will be described with reference to FIG. 4.

Figure 4:
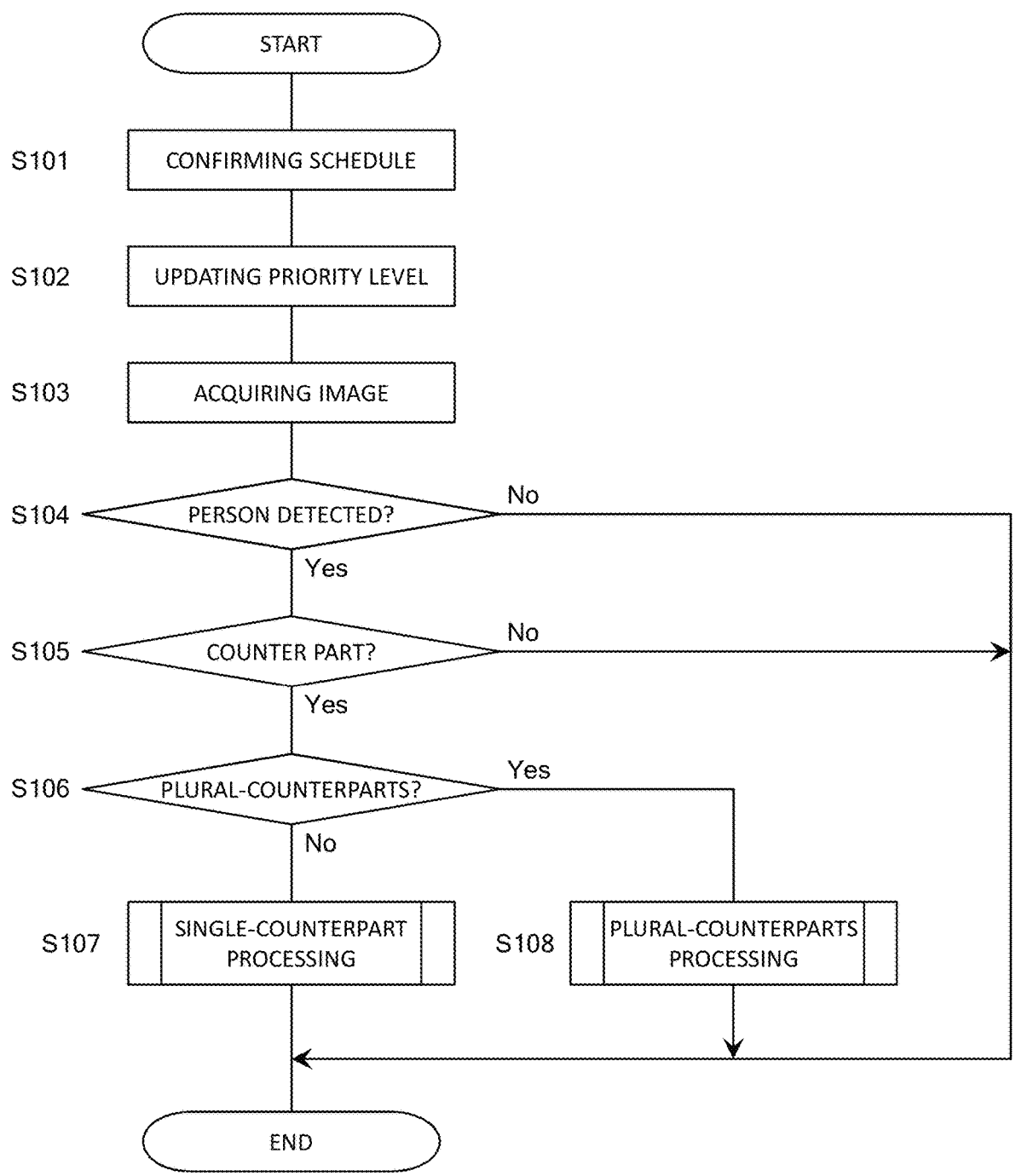
FIG. 4 is a flowchart illustrating an operation example of the communication support device according to the embodiment.

FIG. 4 is a flowchart illustrating the operation example of the communication support device 100. The processing illustrated in FIG. 4 is repeatedly executed by the controller 4, for example, at a constant cycle.

(Step S101)

First, the priority level setting unit 40 accesses the schedule 54 and confirms, for example, whether there is a schedule to meet another person such as a counterpart registered in the counterpart database 51.

(Step S102)

Next, the priority level setting unit 40 updates a priority level of the counterpart in the counterpart database 51 based on a relationship coefficient of the counterpart stored in the counterpart database 51 and a content of the schedule 54. For example, the priority level setting unit 40 sets a high priority level for a counterpart who is scheduled to meet in the near future (for example, within 10 minutes from the current time). For example, the priority level setting unit 40 sets a priority level of the counterpart who is scheduled to meet in the near future to be a sum of a relationship coefficient and an event coefficient (for example, 1), and sets priority levels of the other counterparts to be equal to relationship coefficients.

For example, the priority level setting unit 40 updates the priority level in the counterpart database 51 periodically (for example, every minute). Alternatively, the priority level setting unit 40 may further update the priority level immediately after the schedule 54 is updated.

(Step S103)

Next, the image acquisition unit 41 acquires a captured image captured by the camera 3 (S103). For example, the camera 3 captures an image of a surrounding environment of the user 90 in a time-series manner to generate a plurality of pieces of captured image data. In this manner, the camera 3 may perform imaging at a constant frame rate. The camera 3 may capture a moving image. In Step S103, the image acquisition unit 41 may acquire a plurality of captured images. The image acquisition unit 41 may acquire a moving image formed of a plurality of frames, or may acquire a plurality of still images.

(Step S104)

Next, the counterpart detector 42 analyzes the captured image acquired by the image acquisition unit 41 to detect a person (S104). Here, detecting a person includes detecting a region in the captured image in which a person is presumed to be captured. If no person is detected in Step S104 (No in Step S104), the controller 4 ends the flow illustrated in FIG. 4.

(Step S105)

If a person is detected in Step S104 (Yes in Step S104), the counterpart detector 42 detects whether or not the person detected in Step S104 is a counterpart such as an acquaintance, based on the counterpart database 51 in which information about a face of the counterpart is stored (S105). What is executed in Step S105 is identity identification processing of identifying whether or not a face of the person detected in Step S104 matches or resembles the face of the counterpart. The information about the face referred to by the counterpart detector 42 is not limited to the counterpart database 51 stored in the storage 5. For example, the counterpart detector 42 may refer to a face database stored in an external server connected to a network via the communication interface 6. If the detected person is identified as the counterpart (Yes in Step S105), the processing proceeds to Step S106. In the other case o in Step S105), the controller 4 ends the flow illustrated in FIG. 4.

(Step S106)

If the counterpart is detected in Step S105 (Yes in Step S105), the counterpart detector 42 detects whether the number of detected counterparts is plural (S106). If the number of detected counterparts is not plural, that is, if the number of detected counterparts is singular (one) (No in Step S106), the processing proceeds to single-counterpart processing in Step S107. If the number of detected counterparts is plural (Yes in Step S106), the processing proceeds to plural-counterparts processing in Step S108. Details of Steps S107 and S108 will be described later.

Figure 5:
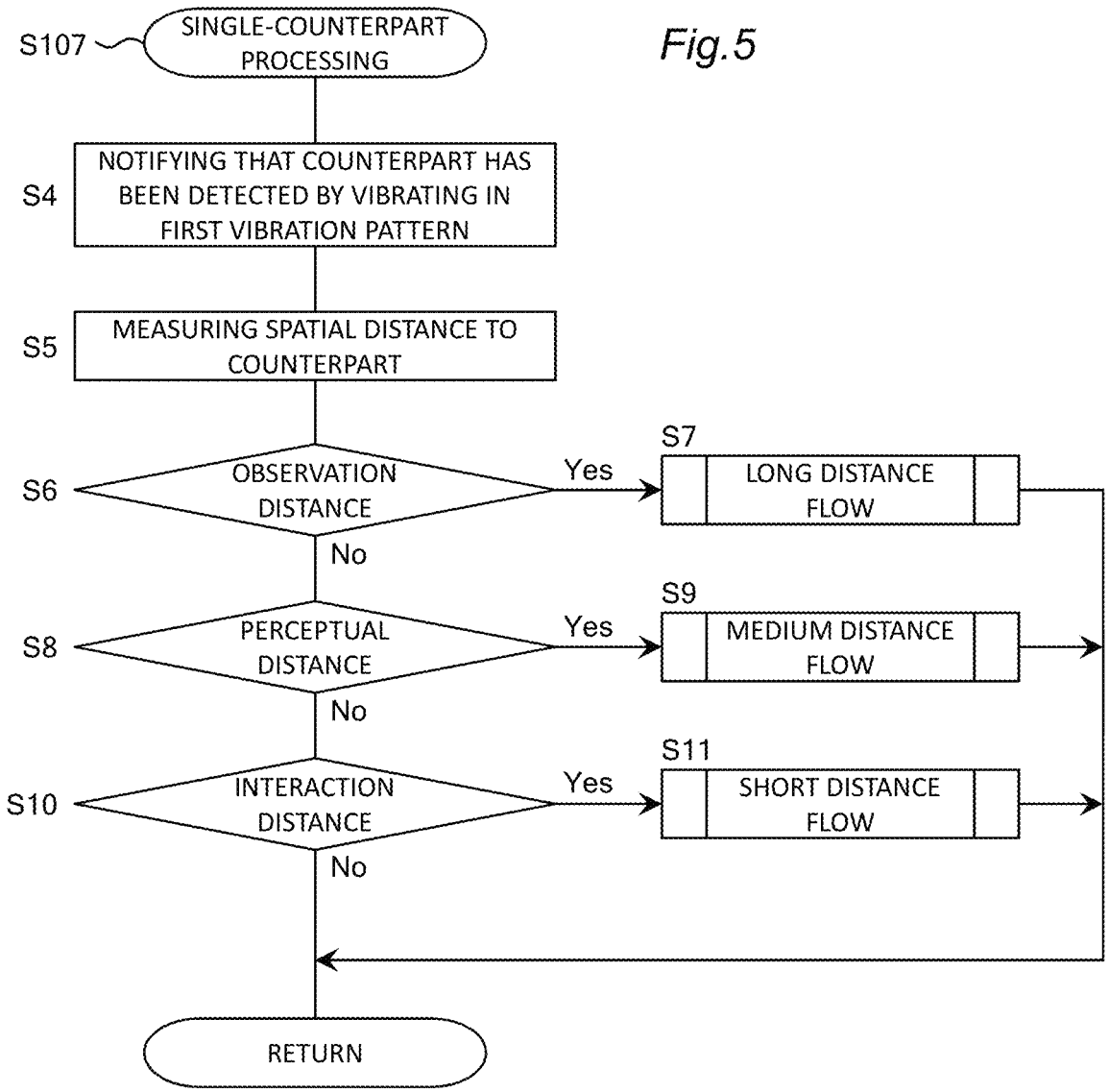
FIG. 5 is a flowchart illustrating a detailed flow of a single-counterpart processing step illustrated in FIG. 4.

3-2. Single-Counterpart Processing 3-2-1. Overall Flow of Single-Counterpart Processing FIG. 5 is a flowchart illustrating a detailed flow of the single-counterpart processing step S107 illustrated in FIG. 4.

First, the vibration unit 2 notifies the user 90 that the counterpart has been detected by a vibration (S4). Specifically, the vibration unit 2 notifies the user 90 that the counterpart has been detected by vibrating in a first vibration pattern. In this manner, the vibration unit 2 performs feedback of the detection of the counterpart to the user 90 in order to alert the user 90. Details of the vibration pattern will be described later.

In Step S4 of FIG. 5, the feedback may be performed by the vibration in the first vibration pattern when the counterpart detected in Step S105 of FIG. 4 enters an observation distance, a perceptual distance, or an interaction distance, which will be described later. In this sense, predetermined distances such as the observation distance, the perceptual distance, and the interaction distance are referred to as feedback distances configured to perform the feedback. That is, the vibration unit 2 may vibrate in the first vibration pattern when the distance between the counterpart and the camera 3 detected by the distance measuring unit 45 is the observation distance, the perceptual distance, or the interaction distance in a case where the counterpart tracker 43 tracks the counterpart.

(Step S5)

Next, the distance measuring unit 45 detects a spatial distance between the camera 3 and the counterpart based on the information detected in Step S104 of FIG. 4, for example (S5). The spatial distance is an example of the "distance" of the present disclosure. Since the camera 3 is the wearable camera worn by the user 90, the camera mounted on the luggage of the user 90, or the like, it can be said that a spatial distance between the camera 3 and the counterpart s about the same as the spatial distance between the user 90 and the counterpart.

The spatial distance generally means a distance between two points and can vary depending on a path between these points. The spatial distance between the user 90 and the counterpart can be roughly classified into three categories, for example, the observation distance, the perceptual distance, and the interaction distance. In accordance with these spatial distances, a space around the user 90 can be roughly classified into an observation space, a perceptual space, and an interaction space. FIG. 6 is a schematic view for describing an example of the spatial distance.

The observation distance is, for example, a distance at which a person carefully observes an object or a counterpart in order to acquire information. For example, when another person is at the observation distance, the user 90 can observe the other person and identify whether or not the other person is an acquaintance and who the acquaintance is. The observation distance represents, for example, a distance longer than a predetermined second threshold. The observation distance corresponds to a case where the spatial distance between individuals is longer than, for example, 3.6 m.

The perceptual distance is, for example, a distance at which a motion and/or an emotion of another person is interpreted or perceived through the senses (for example, five senses, particularly, the visual and auditory senses). For example, when another person is at the perceptual distance, the user 90 can observe emotions such as enjoyment, anger, and sadness by observing a facial expression, a motion, and the like of the other person. In addition, for example, when another person is at the perceptual distance, the user 90 can recognize a motion such as whether the other person is looking at the user 90, is working by operating a telephone or a tablet, or is waving his/her hand at the user 90. The perceptual distance represents, for example, a distance longer than a predetermined first threshold and equal to or less than the second threshold. The perceptual distance corresponds to a case where the spatial distance between individuals is, for example, longer than 1.2 m and equal to or less than 3.6 m.

The interaction distance is, for example, a distance at which an interaction with another person, such as a conversation, is usually performed. The interaction distance represents, for example, a distance of the first threshold or less. The interaction distance corresponds to a case where the spatial distance between individuals is, for example, 1.2 m or less.

Here, the spatial distances that can be distinguished into the three categories of the observation distance, the perceptual distance, and the interaction distance has been described as an example. However, the concept of the spatial distance is not limited to these. For example, the spatial distance may be roughly classified into a public space, a social space, a personal space, and the like based on Proxemics (Hall, E. T., The hidden dimension, New York: Doubleday, 1966). In addition, the spatial distance may differ depending on the intimacy between persons, the culture to which a person belongs, a gender of a person, and the like.

(Steps S6 to S11)

Returning to FIG. 5, the controller 4 proceeds to Step S7 to execute a long distance flow if the spatial distance between the camera 3 and the counterpart is the observation distance as a result of the measurement in Step S5 (when Yes in Step S6). In the case of the perceptual space (Yes in Step S8), the controller 4 proceeds to Step S9 to execute a medium distance flow. In the case of the interaction space (Yes in Step S10), the controller 4 proceeds to Step S11 to execute a short distance flow In this manner, the communication support device 100 executes different processes according to the spatial distance between the camera 3 and the counterpart at the timepoint when the counterpart is found in Step S105 of FIG. 4.

3-2-2. Long Distance Flow 3-2-2-1. Overall Flow

Figure 7A:
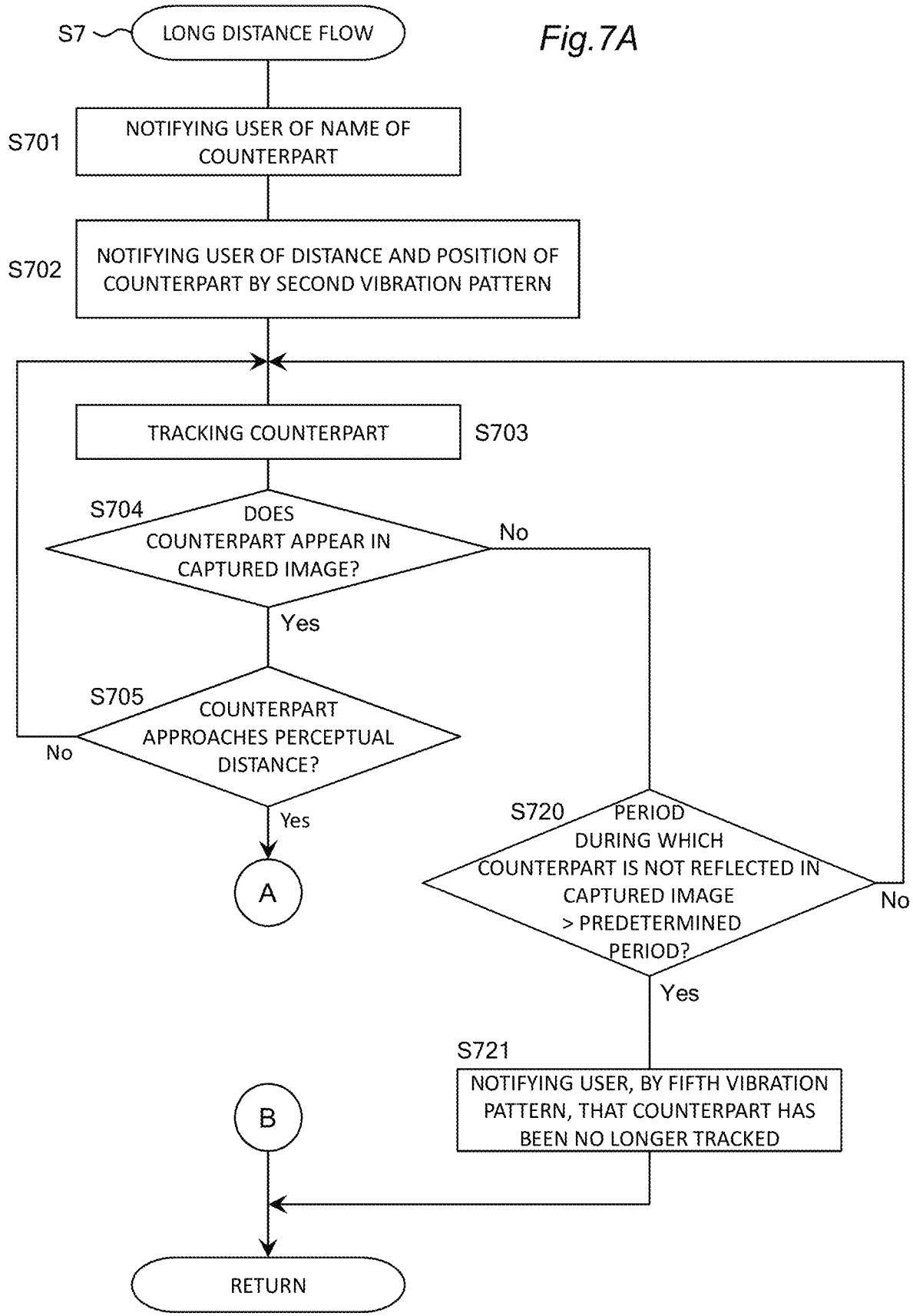
FIG. 7A is a flowchart illustrating a detailed flow of a long distance flow illustrated in FIG. 5.

FIG. 7A and FIG. 7B are flowcharts illustrating a detailed flow of the long distance flow S7 illustrated in FIG. 5. FIG. 7A and FIG. 7B are connected by connector A and connector B. The flow illustrated in FIG. 7A and FIG. 7B may be executed in real time, that is, every time the image acquisition unit 41 acquires an image. Alternatively, the flow illustrated in FIG. 7A and FIG. 7B may be executed for captured images of a plurality of frames acquired by the image acquisition unit 41 for a few seconds to a few tens of seconds.

(Step S701)

First, the voice output unit 1 notifies the user 90 of a name of the counterpart detected in Step S105 by a voice (S701). As a result, the user 90 can know the name of the counterpart who is close to him/her and can identify who is close to him/her. The name of the counterpart is an example of the identification information for identifying the counterpart in the present disclosure.

(Step S702)

Next, the vibration unit 2 notifies the user 90 of a spatial distance to the counterpart and a position of the counterpart by a vibration (S702). Specifically, the vibration unit 2 notifies the user 90 of the position of the counterpart and that the counterpart is at the observation distance by vibrating in a second vibration pattern. Details of the vibration pattern will be described later. The spatial distance is the one measured by the distance measuring unit 45 in Step S5 of FIG. 5. The position of the counterpart is detected, for example, by the position detector 44. The position of the counterpart is determined, for example, by any direction of the right side, the front direction, or the left side where the counterpart exits with an optical axis of the camera 3 as a reference. Further, the position of the counterpart may be determined, for example, by any direction of the upper side and the lower side where the counterpart exists with the optical axis of the camera 3 as the reference. In other words, the position of the counterpart may represent an index that identifies any direction of up, down, left, right, and front where the counterpart exists as viewed from the user 90.

(Step S703)

Next, the counterpart tracker 43 tracks the counterpart detected in Step S105 of FIG. 4 (S703). Specifically, the counterpart tracker 43 tracks a counterpart in a current frame captured after a reference frame based on a position in an image of a counterpart detected or tracked in the reference frame. The counterpart can be tracked by, for example, saving the counterpart in the reference frame as a template in the storage 5 and applying a method such as known template matching using the template to search the current frame.

For example, the counterpart tracker 43 calculates a matching score indicating the certainty that the counterpart detected or tracked in the reference frame and the counterpart tracked in the current frame are the same counterpart. The matching score is, for example, a value in the range of 0 to 1, and a larger value means that there is a high possibility that the counterpart detected in the reference frame and the counterpart detected in the current frame are the same counterpart. When the matching score is a predetermined threshold or more, the counterpart tracker 43 determines that the counterpart detected in the reference frame and the counterpart detected in the current frame are the same counterpart, and considers that the tracking of the counterpart is successful.

(Step S704)

In the tracking processing, the counterpart tracker 43 determines whether or not the detected or tracked counterpart appears in the captured image (S704). For example, the counterpart tracker 43 determines whether or not the counterpart is reflected in the current frame. The process proceeds to Step S705 if it is determined that the counterpart is reflected in the captured image (Yes in Step S704), and proceeds to Step S720 if it is determined that the counterpart is not reflected (No in Step S704).

(Step S705)

The distance measuring unit 45 determines whether or not the counterpart has approached the perceptual distance (S705). Specifically, the distance measuring unit 45 determines whether or not the counterpart who was at the observation distance in the frame used in Step S5 of FIG. 5 is at the perceptual distance in a frame captured at the subsequent timing. For example, the distance measuring unit 45 determines that the counterpart has approached the perceptual distance when the distance between the camera 3 and the counterpart is 3.6 m. The process proceeds to Step S706 in FIG. 7B if the counterpart approaches the perceptual distance (Yes in Step S705), and returns to Step S703 if the counterpart has not approached the perceptual distance (No in Step S705). If the counterpart has not approached the perceptual distance, the controller 4 may end the processes of FIG. 7A and FIG. 5.

(Step S706)

In Step S706 illustrated in FIG. 7B, the expression determination unit 46 determines a facial expression of the counterpart based on the captured image (S706). Details of the facial expression determination processing step S706 will be described later.

(Step S707)

Next, the voice output unit 1 notifies the user 90 of facial expression information related to the facial expression determined by the expression determination unit 46 in Step S706 by a voice (S707). Here, the facial expression information may include not only information representing a human facial expression itself, but also information indicating whether a person wears a wearable object or a shield, such as a mask, an eye patch. eyeglasses, and sunglasses, on the face. For example, the voice output unit 1 notifies the user 90 of the facial expression information such as "smiling", "angry", "expressionless (neutral expression)", "facial expression is unknown", and "wearing a mask". As a result, the user 90 can know the facial expression of the counterpart close to him/her, and can smoothly communicate according to the facial expression.

(Step S708)

Next, the vibration unit 2 notifies the user 90 of a spatial distance to the counterpart and a position of the counterpart by a vibration (S708). Specifically, the vibration unit 2 notifies the user 90 of the position of the counterpart and that the counterpart is at the perceptual distance by vibrating in a third vibration pattern. Details of the vibration pattern will be described later.

(Step S709)

Next, the motion determination unit 47 determines a motion of the counterpart based. on the captured image (S709). Details of the motion determination processing step S709 will be described later.

(Step S710)

Next, the voice output unit 1 notifies the user 90 of motion information related to the motion determined by the motion determination unit 47 in Step S709 by a voice (S710). For example, the voice output unit 1 notifies the user 90 of the motion information such as "the counterpart is looking at you", "the counterpart is waving his/her hand", "the counterpart is talking on the phone", "the counterpart is coughing", and "the motion of the counterpart is unknown". As a result, the user 90 can know the motion of the counterpart, and can smoothly communicate according to the motion.

(Step S711)

Next, the distance measuring unit 45 determines whether or not the counterpart has approached the interaction distance (S711). Specifically, the distance measuring unit 45 determines whether or not the counterpart who was at the perceptual distance in the frame used in Step S705 of FIG. 7A is at the interaction distance in a frame captured at the subsequent timing. For example, the distance measuring unit 45 determines that the counterpart has approached the interaction distance when the distance between the camera 3 and the counterpart is 1.2 m. The process proceeds to Step S712 if the counterpart approaches the interaction distance (Yes in Step S711), and returns to Step S709 if the counterpart has not approached the interaction distance (No in Step S711). If the counterpart does not approach the interaction distance even after a lapse of a long period of time, the controller 4 may end the processes of FIGS. 7B and 5.

(Step S712)

Next, the vibration unit 2 notifies the user 90 of a spatial distance to the counterpart and a position of the counterpart by a vibration (S712). Specifically, the vibration unit 2 notifies the user 90 of the position of the counterpart and that the counterpart is at the interaction distance by vibrating in a fourth vibration pattern. Details of the vibration pattern will be described later. As a result, the user 90 can know that the counterpart is at the interaction distance and can start communication with the counterpart.

(Step S713)

After Step S712, the controller 4 executes post-interaction processing, for example, after the user 90 finishes communicating with the counterpart, (S713). For example, the controller 4 controls the vibration unit 2 to notify that the counterpart has left the user 90 by a vibration. As a result, the user 90 can know that the counterpart has left, and can resume an action such as moving to a destination that has been taken before the communication with the counterpart. Details of the post-interaction processing S713 will be described later.

(Step S720)

Returning to FIG. 7A, if it is determined in Step S704 that the counterpart is not reflected in the captured image, the controller 4 determines whether or not a period during which the counterpart is not reflected in the captured image is longer than a predetermined period (S720). The predetermined period is, for example, one second to several minutes, for example, four seconds. Instead of the period, the number of frames may be set in advance. For example, the controller 4 may determine whether or not the counterpart is reflected in a predetermined number of consecutive frame images. The process proceeds to Step S721 if the period during which the counterpart is not reflected in the captured image is longer than the predetermined period (Yes in Step S720), and returns to Step S703 if the period is the predetermined period or less (No in Step S720).

(Step S721)

If the period during which the counterpart is not reflected in the captured image is longer than the predetermined period (Yes in Step S720), the vibration unit 2 notifies the user 90 that the counterpart has been no longer tracked by a vibration (S721). Specifically, the vibration unit 2 notifies the user 90 that the counterpart has been no longer tracked by vibrating in a fifth vibration pattern. Details of the vibration pattern will be described later. As a result, the user 90 can know that the counterpart has been no longer tracked or that the counterpart has left the periphery of the user 90. After Step S721, the components such as the controller 4, and the notification unit 10 may resume a navigation operation to a destination or the like, which is a normal operation performed before the detection of the counterpart, for the user 90.

3-2-2-2. Facial Expression Identification Processing

Figure 8:
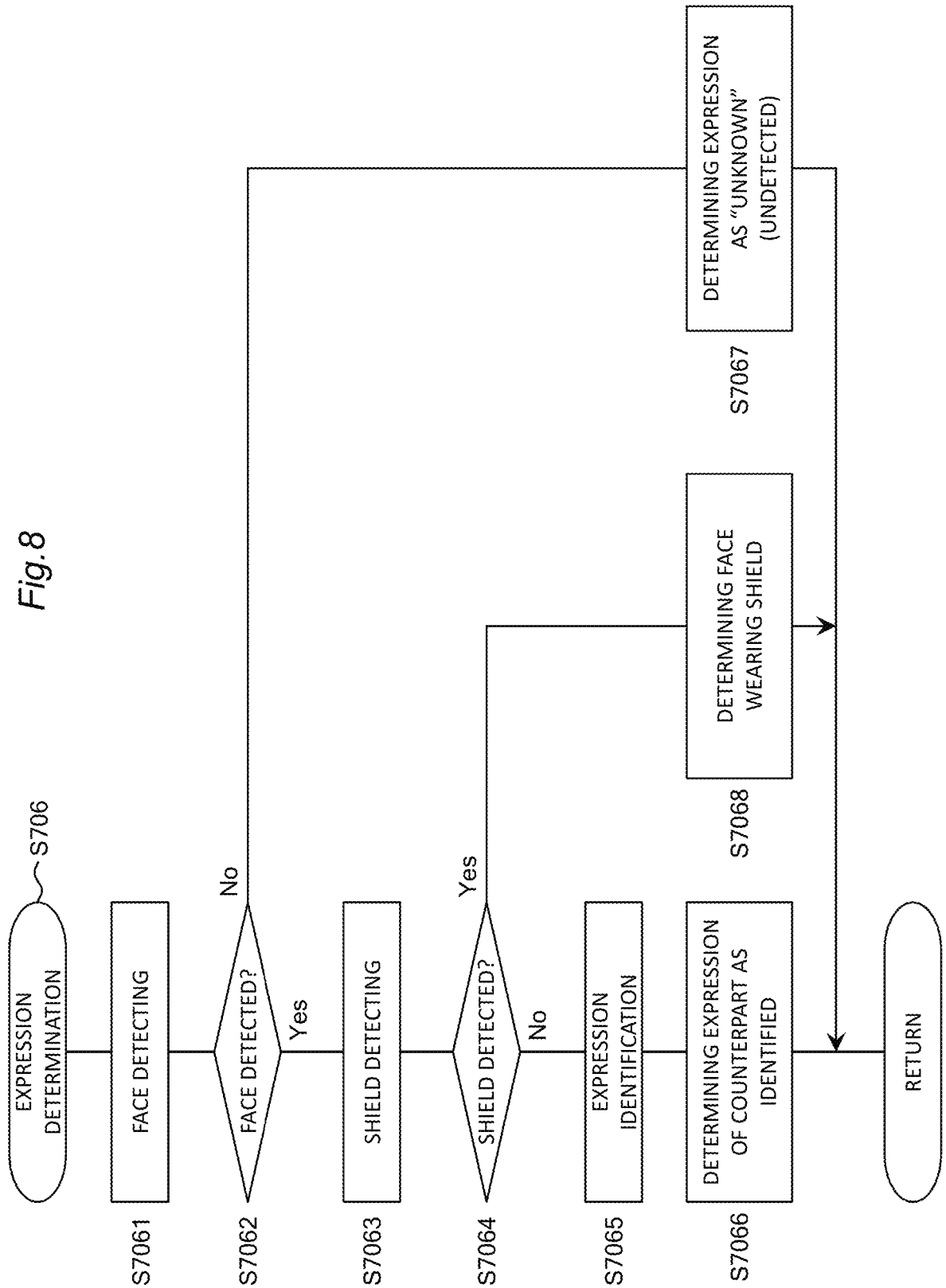
FIG. 8 is a flowchart illustrating a detailed flow of a facial expression determination processing step illustrated in FIG. 7B.

FIG. 8 is a flowchart illustrating a detailed flow of the facial expression determination processing step S706 illustrated in FIG. 7B.

(Step S7061)

First, the expression determination unit 46 analyzes the captured image and detects a face of the counterpart (S7061). Here, detecting the face includes detecting a region in the captured image in which a human is presumed to be captured.

(Step S7062)

If the face of the counterpart is detected (Yes in Step S7062), the process proceeds to Step S7063. If the face of the counterpart is not detected (No in Step S7062), the process proceeds to Step S7067.

(Step S7063)

If the face of the counterpart is detected (Yes in Step S7062), the expression determination unit 46 detects whether or not the counterpart is wearing a shield such as a mask, an eyepatch, eyeglasses, and sunglasses (S7063). There is a case where it is difficult to detect the face because the counterpart is wearing the shield, and thus, shield detection processing is adopted in the embodiment. For example, a technique disclosed in Japanese Patent Application Laid-Open No. 2018-151919 is applied to a method for detecting whether or not the counterpart is wearing the shield.

If it is detected in Step S7063 that the counterpart is wearing the shield (Yes in Step S7064), the expression determination unit 46 determines the face wearing the shield for the facial expression information related to the facial expression of the counterpart (S7068). The expression determination unit 46 may identify what the shield is. For example, in Step S7068, the expression determination unit 46 may determines the face wearing a mask for the facial expression information related to the facial expression of the counterpart.

If it is not detected in Step S7063 that the counterpart is wearing the shield (No in Step S7064), the expression determination unit 46 identifies the facial expression of the counterpart (S7065). For example, the expression determination unit 46 compares the expression database 52 storing information on human facial expressions with the face of the counterpart in the captured image and identifies the facial expression of the counterpart.

A known method may be used for the identification of the facial expression. For example, the expression determination unit 46 detects organs of a face (hereinafter, referred to as "facial organs") in the face of the counterpart. The facial organ is a collection of tissues including those having specific functions. For example, the facial organs include eyes, a nose, a mouth, and ears. The facial organs may include skin. The entire face may be included in the facial organs. The expression determination unit 46 identifies the facial expression based on information on the detected facial organs. For example, the expression determination unit 46 detects a distance between feature points of the face, such as eyes, eyebrows, and a mouth, or an edge of a facial surface as information representing a facial expression from the information on the facial organs.

For example, the expression determination unit 46 extracts a feature value related to a relative position and a shape of the facial organ based on position information of the facial organ. Examples of the feature value include a Haar-like feature value, a distance between feature points, and a Fourier descriptor. Next, the extracted feature value may be input to a facial expression discriminator configured to discriminate a facial expression to output a facial expression score (facial expression component value). Examples of the facial expression score include a smiling degree indicating the degree of smile, a happiness degree indicating the degree of happiness, and the like. The facial expression discriminator is constructed by learning a large number of face sample images by machine learning such as a neural network and a self-organizing map.

Identifying the facial expression includes discriminating a type of facial expression, that is, identifying a type of facial expression to be recognized by a word indicating an emotion. Here, the facial expression may be identified by a word indicating a single emotion or by a combination of words indicating emotions. When words indicating emotions are combined, the words that indicate the respective emotions may be weighted. For example, facial expressions are classified into seven types of "neutral", "enjoyment", "anger", "disgust", "surprise", "fear", and "sadness" based on Paul Ekman's facial expression analysis. A numerical score is output as a facial expression identification result such that a total of degrees of the seven types of facial expressions (also called facial expression likeness or facial expression degree) is one. A score of each facial expression is also called the facial expression component value.

The above facial expression discriminator is not necessarily one, and may be formed of seven discriminators that are in charge of the seven types of facial expressions described above.

As a method for presuming the facial expression, techniques exemplified in Japanese Patent Application Laid-Open No. 2019-111092, Japanese Patent Application Laid-Open No. 2016-149063, Japanese Patent Application Laid-Open No. 2014-206903, and the like may be applied.

(Step S7066)

The expression determination unit 46 determines the facial expression of the counterpart as the one identified in Step S7065 (S7066). For example, the expression determination unit 46 determines the facial expression of the counterpart as the facial expression of "enjoyment".

(Step S7067)

If the face of the counterpart is not detected in Step S7061 (No in Step S7062), the expression determination unit 46 determines the facial expression of the counterpart as "unknown" (S7067). The expression determination unit 46 may determines that the facial expression of the counterpart is "unknown because the face has not been detected". Here, a "case where the face of the counterpart has not been detected" includes a case where the face of the counterpart has not been detected in a captured image of one frame. In addition, the "case where the face of the counterpart has not been detected" may include a case where the face detection processing has been attempted on captured images of a plurality of frames, but the face of the counterpart has not been detected in any of the frames.

As described above, the facial expression information determined in the facial expression determination processing step S706 of FIG. 6 is notified to the user 90 in Step S707 illustrated in FIG. 7B. For example, the voice output unit 1 notifies the user 90 of the facial expression information such as "smiling", "angry", "expressionless (neutral expression)", "facial expression is unknown", and "wearing a mask". As a result, the user 90 can know the facial expression of the counterpart close to him/her, and can smoothly communicate according to the facial expression. For example, the user 90 can choose not to talk to the counterpart when being notified of the facial expression information indicating that the counterpart is angry.

In addition, for example, when being notified of the facial expression information indicating that the counterpart is wearing the mask in a situation where an infectious disease is prevalent, the user 90 can chose to perform a motion such as moving away from the counterpart and to secure a social distance from the counterpart (social distancing). Alternatively, the user 90 can ask the counterpart about his/her physical condition, for example, when being notified of the facial expression information indicating that the counterpart is wearing the mask. When the counterpart is ill, in poor physical condition, and the like, the user 90 can choose to perform a motion to secure a social distance from the counterpart. In this manner, the user 90 can reduce a risk of infection from others such as the counterpart based on the information notified from the communication support device 100, for example, in the situation where infectious diseases are prevalent. In this manner, communicating with others while adjusting the distance to the others according to the situation is also included in smooth communication.

3-2-2-3. Motion Identification Processing

Figure 9:
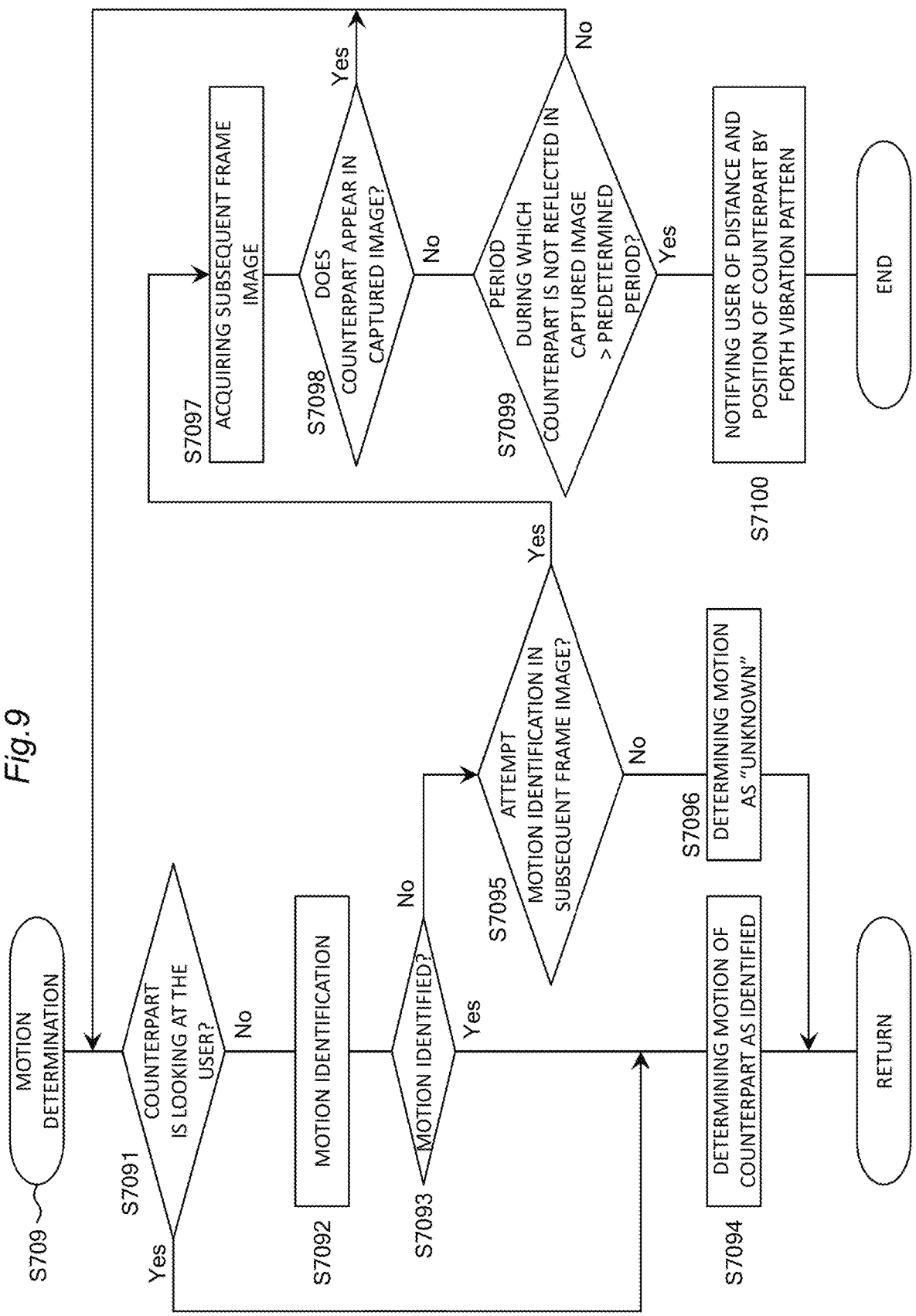
FIG. 9 is a flowchart illustrating a detailed flow of a motion determination processing step illustrated in FIG. 7B.

FIG. 9 is a flowchart illustrating a detailed flow of the motion determination processing step S709 illustrated in FIG. 7B.

(Step S7091)

First, the motion determination unit 47 detects whether or not the counterpart is looking at the user 90 (S7091). For example, the motion determination unit 47 detects whether or not a face of the counterpart is facing the camera 3. Since the camera 3 is the camera such as the wearable camera worn by the user 90 and the camera mounted on the luggage of the user 90, a case where the face of the counterpart is facing the camera 3 can be regarded as the same with a case where the counterpart is looking at the user 90. Alternatively, the motion determination unit 47 may detect irises or pupils of the counterpart to detect a line of sight of the counterpart based on positions of the detected irises or pupils. A case where a difference between a direction of the line of sight of the counterpart and a direction of the optical axis of the camera 3 is small can be regarded as the same with a case where the counterpart is looking at the user 90. If detecting that the counterpart is looking at the user 90 (Yes in S7091), the process proceeds to Step S7094.

(Steps S7092, S7093)

If the counterpart looking at the user 90 is not detected (No in S7091), the motion determination unit 47 identifies a motion of the counterpart (S7092). For example, the motion determination unit 47 compares the motion database 53 storing information on human motions with information on a motion such as a posture of the counterpart in the captured image, and identifies the motion of the counterpart. Examples of the motion of the counterpart include motions of the counterpart such as talking on the phone, reading a book, waving one's hand, running, walking, and coughing. Although whether or not the counterpart is looking at the user 90 is determined in Step S7091 in the above example, but the embodiment is not limited thereto. For example, the determination on whether or not the counterpart is looking at the user 90 may be included in the motion identification in Step S7092. The process proceeds to Step S7094 if the motion of the counterpart is identified (Yes in Step S7093), and proceeds to Step S7095 if the motion of the counterpart is not identified (No in Step S7093).

(Step S7094)

When the motion of the counterparts identified (Yes in Step S7093), the motion determination unit 47 determines the motion of the counterpart as the one identified in Step S7092 (Step S7094). In addition, when it is detected in Step S7091 that the counterpart is looking at the user 90 (Yes in S7091), looking at the user 90 is identified for the motion of the counterpart in Step S7094. The determined motion is notified to the user 90 in Step S710 of FIG. 7B as described above.

(Step S7095)

If the motion of the counterpart is not identified in Step S7093, the motion determination unit 47 determines whether to attempt motion identification in another frame image captured at a timing subsequent to a timing when the frame image used in Step S7092 has been captured (S7095). Information on which period of a frame image the motion identification is attempted, or information on how many frame images the motion identification is attempted may be set in advance.

(Step S7096)

If it is determined in Step S7095 that no further motion identification is attempted (No in Step S7095), the motion determination unit 47 determines the motion of the counterpart as "unknown" (S7096). The identified motion is notified to the user 90 in Step S710 of FIG. 7B as described above.

(Step S7097)

The motion determination unit 47 acquires another frame image captured at a timing subsequent to a timing when the frame image used in Step S7092 has been captured (S7097).

(Step S7098)

Steps S7098 to S7100 are the same steps as Steps S704, S720, and S721 in FIG. 7A, respectively. In Step S7098, the motion determination unit 47 determines whether or not the counterpart is reflected in the frame image acquired in Step S7097 (S7098). The process return to Step S7091 if it is determined that the counterpart is reflected in the frame image (Yes in Step S7098), and proceeds to Step S7099 if it is determined that the counterpart is not reflected (No in Step S7098).

(Step S7099)

The controller 4 determines whether or not a period during which the counterpart is not reflected in the captured image is longer than a predetermined period (S7099). The process proceeds to Step S7100 if the period during which the counterpart is not reflected in the captured image is longer than the predetermined period (Yes in Step S7099), and returns to Step S7091 if the period is the predetermined period or less (No in Step S7099).

(Step S7100)

If the period during which the counterpart is not reflected in the captured image is longer than the predetermined period (Yes in Step S7099), the vibration unit 2 notifies the user 90 that the counterpart has been no longer tracked by a vibration (S7100). Specifically, the vibration unit 2 notifies the user 90 that the counterpart has been no longer tracked by vibrating in a fifth vibration pattern. As a result, the user 90 can know that the counterpart has been no longer tracked or that the counterpart has left the periphery of the user 90. After the notification in Step S7100, the controller 4 ends a series of processes illustrated in FIG. 5. The flow of FIG. 5 may be started repeatedly. The flow of FIG. 5 is started, for example, every predetermined cycle.

3-2-2-4. Post-Interaction Processing

Figure 10:
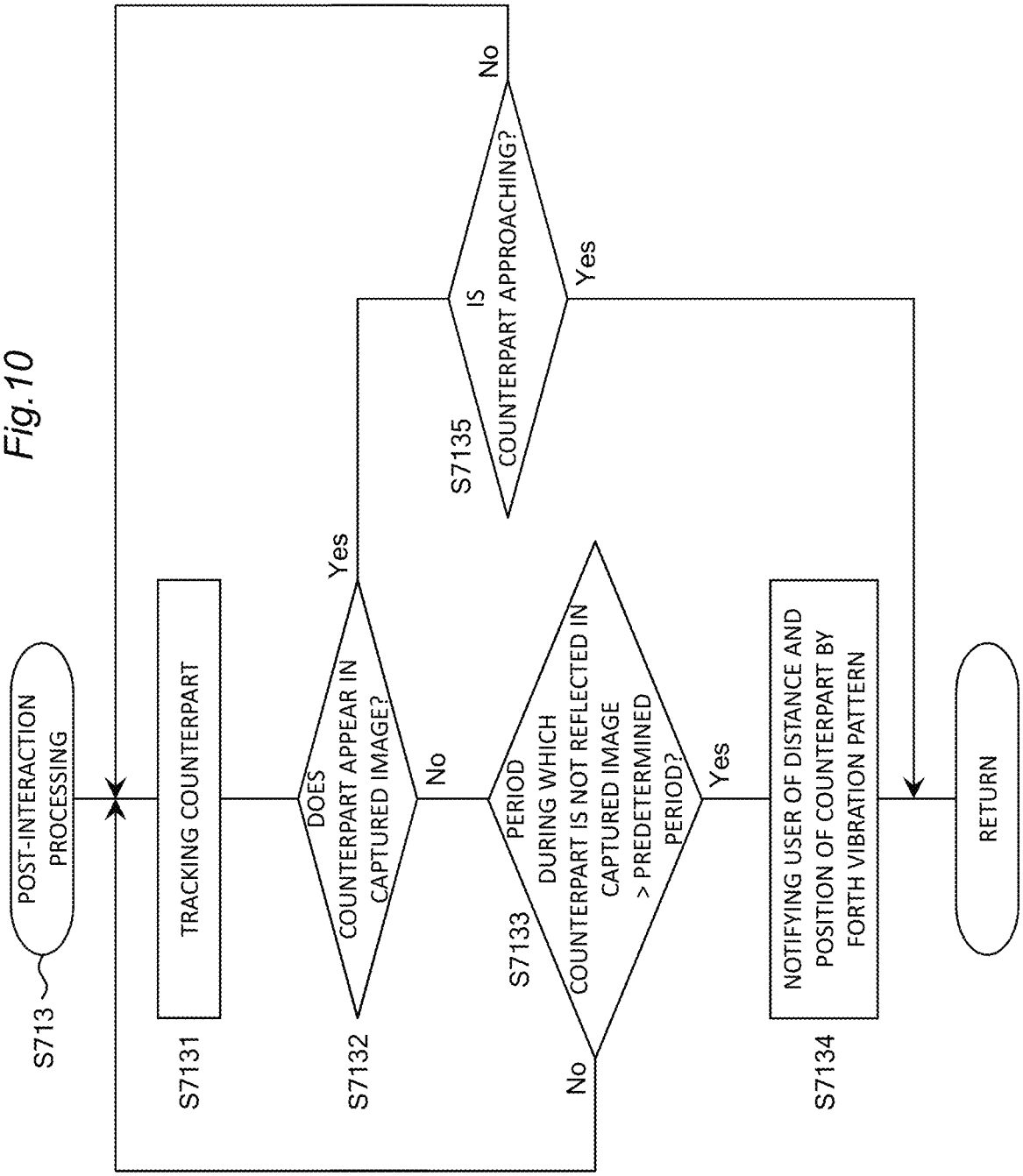
FIG. 10 is a flowchart illustrating a detailed flow of a post-interaction processing step illustrated in FIG. 7B.

FIG. 10 is a flowchart illustrating a detailed flow of the post-interaction processing step S713 illustrated in FIG. 7B.

(Step S7131)

First, the counterpart tracker 43 tracks the counterpart (S7131). In the tracking step S7131, the same processing as that in the tracking step S703 illustrated in FIG. 7A may be executed.

(Step S7132)

Next, the counterpart tracker 43 determines whether or not the detected or tracked counterpart appears in the captured image in the tracking processing. (S7132). For example, the counterpart tracker 43 determines whether or not the counterpart is reflected in the current frame. The process proceeds to Step S7133 if it is determined that the counterpart is not reflected in the captured image (No in Step S7132), and proceeds to Step S7135 if it is determined that the counterpart is reflected (Yes in Step S7132).

(Step S7133)

The controller 4 determines whether or not a period during which the counterpart is not reflected in the captured image is longer than a predetermined period (S7133). The process proceeds to Step S7134 if the period during which the counterpart is not reflected in the captured image is longer than the predetermined period (Yes in Step S7133), and returns to Step S7131 if the period is the predetermined period or less (No in Step S7133).

(Step S7134)

If the period during which the counterpart is not reflected in the captured image is longer than the predetermined period (Yes in Step S7133), the vibration unit 2 notifies the user 90 that the counterpart has been no longer tracked by a vibration (S7134). Specifically, the vibration unit 2 notifies the user 90 that the counterpart has been no longer tracked by vibrating in a fifth vibration pattern. As a result, the user 90 can know that the counterpart has been no longer tracked or that the counterpart has left the periphery of the user 90. As a result, the user 90 can concentrate on a motion such as moving to a destination. Since the user 90 can concentrate on his/her own motion, the safety of the user 90 is also ensured. Step S7134 may be the same step as Step S721 illustrated in FIG. 7A.

(Step S7135)

If it is determined in Step S7132 that the counterpart is reflected in the captured image (Yes in Step S7132), the distance measuring unit 45 detects whether or not the counterpart is approaching (S7135). Specifically, the distance measuring unit 45 compares a distance between the camera 3 and the counterpart in two frame images captured at different timings, and detects whether or not the counterpart is approaching.

If detecting that the counterpart is approaching (Yes in Step S7135), the user 90 is likely to re-communicate with the counterpart. Therefore, the controller 4 may temporarily end the series of processes illustrated in FIG. 5 and start the process of FIG. 5 again. The flow of FIG. 5 is started, for example, every predetermined cycle. If detecting that the counterpart s not approaching (No in Step S7135), the controller 4 returns to Step S7131 and continues tracking.

3-2-2-5. Example of Long Distance Flow

Figure 11:
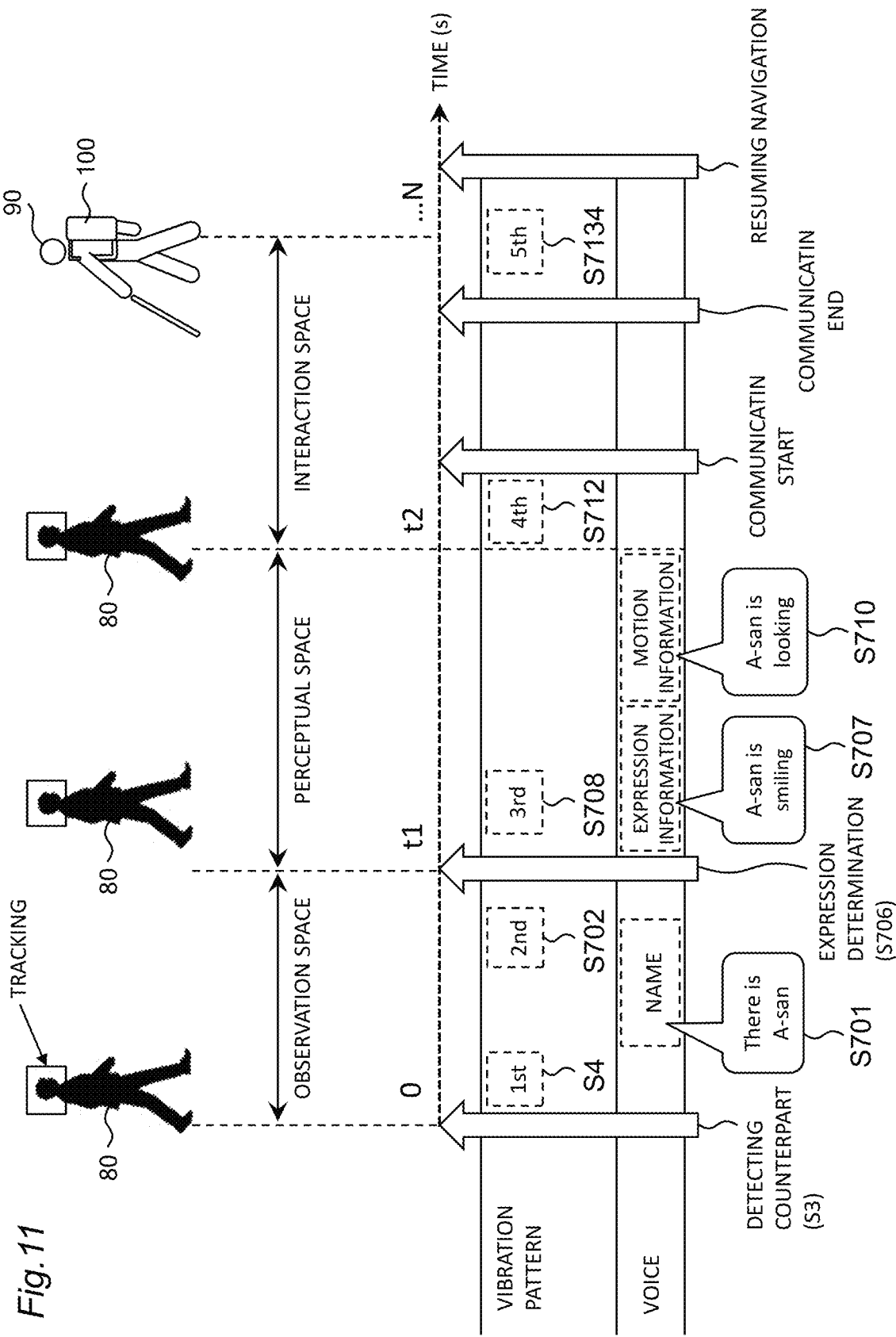
FIG. 11 is a schematic view illustrating an example of an operation including the long distance flow of the communication support device according to the embodiment.

FIG. 11 is a schematic view illustrating an example of an operation of the communication support device 100 when the detected spatial distance to the counterpart 80 is the observation distance (Yes in Step S6 of FIG. 5). When the communication support device 100 detects the counterpart 80 in the observation space, the communication support device 100 causes the vibration unit 2 to vibrate in the first first vibration pattern in order to alert the user 90 (S4). Next, the voice output unit 1 notifies the user 90 of the name of the counterpart 80 by the voice (S701), and the vibration unit 2 notifies the spatial distance to the counterpart 80 and the position of the counterpart 80 by vibrating in the second vibration pattern (S702).

Thereafter, when the counterpart 80 enters the perceptual space, the voice output unit 1 notifies the user 90 of the facial expression information of the counterpart 80 by the voice (S707), and the vibration unit 2 notifies the spatial distance to the counterpart and the position of the counterpart by vibrating in the third vibration pattern (S708). Further, the voice output unit 1 notifies the user 90 of the motion information of the counterpart 80 by the voice (S710).

Thereafter, when the counterpart 80 enters the interaction space, the vibration unit 2 notifies the spatial distance to the counterpart and the position of the counterpart by vibrating in the fourth vibration pattern (S712). As a result, the user 90 can know that the counterpart is at the interaction distance and can start communication with the counterpart. After the user 90 finishes communicating with the counterpart, for example, the vibration unit 2 notifies that the counterpart has left the user 90 by vibrating in the fifth vibration pattern (S7134). Thereafter, the components such as the controller 4, and the notification unit 10 may resume a navigation operation to a destination or the like, which is a normal operation performed before the detection of the counterpart, for the user 90.

3-2-3. Medium Distance Flow

Figure 12:
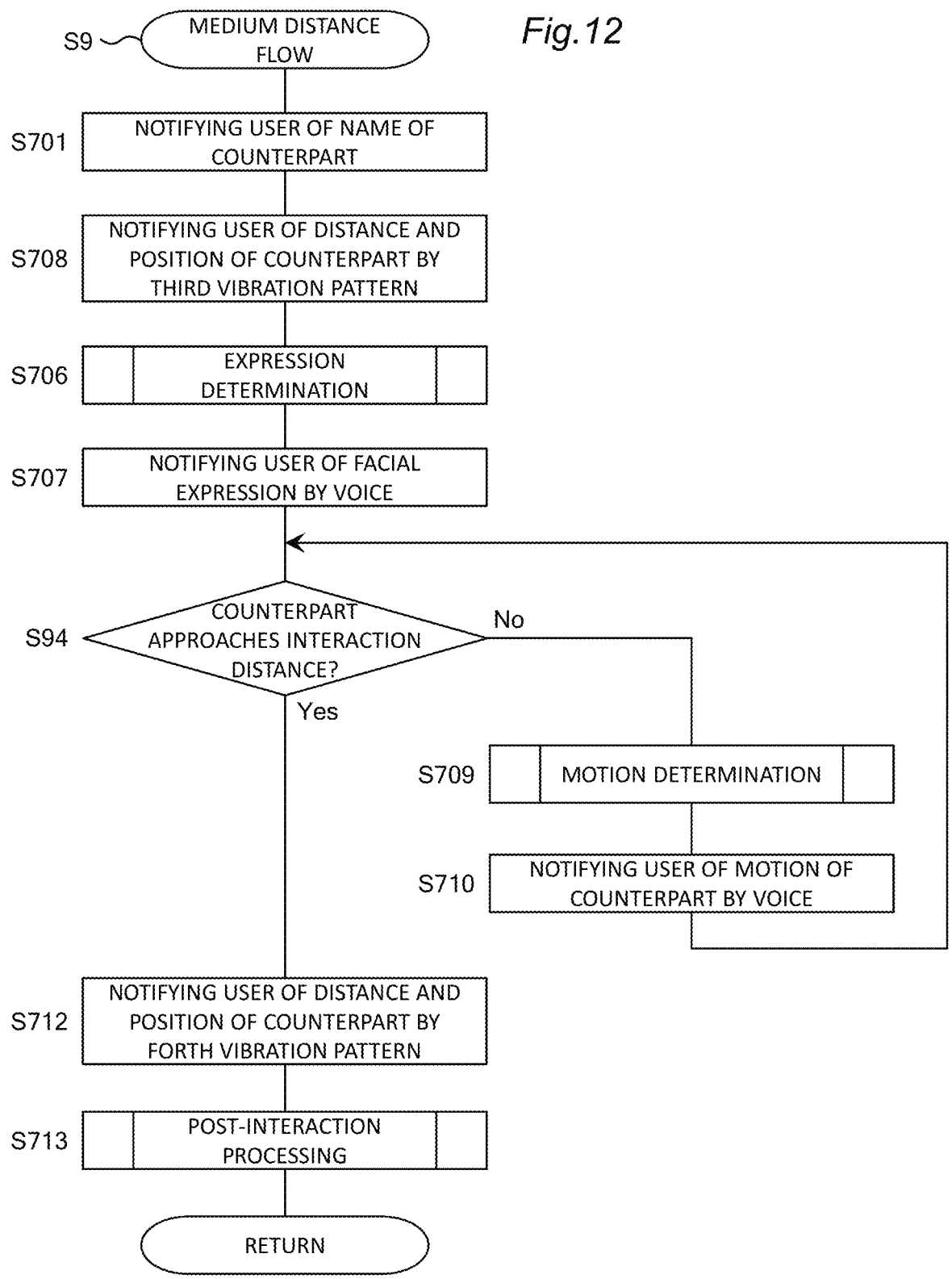
FIG. 12 is a flowchart illustrating a detailed flow of a medium distance flow illustrated in FIG. 5.

FIG. 12 is a flowchart illustrating a detailed flow of the medium distance flow S9 illustrated in FIG. 5. In the medium distance flow S9, the same or similar steps as those described in the above-described long distance flow S7 are denoted by the same reference signs. As such steps, the medium distance flow S9 includes Steps S701, S706 to S710, S712, and S713. Duplicate descriptions are sometimes omitted for such steps.

In the medium distance flow S9, first, the voice output unit 1 notifies the user 90 of the name of the counterpart detected in Step S105 by the voice (S701). Next, the vibration unit 2 notifies the user 90 of a spatial distance to the counterpart d a position of the counterpart by a vibration (S708). Specifically, the vibration unit 2 notifies the user 90 of the position of the counterpart and that the counterpart is at the perceptual distance by vibrating in a third vibration pattern.

Next, the expression determination unit 46 determines the facial expression of the counterpart based on the captured image (S706). Next, the voice output unit 1 notifies the user 90 of facial expression information related to the facial expression determined by the expression determination unit 46 in Step S706 by a voice (S707). The facial expression determination processing step S706 may be executed before Step S701 of notifying the name of the counterpart.

Next, the distance measuring unit 45 determines whether or not the counterpart has approached the interaction distance (S94). Step S94 may be the same step as the above-described Step S711 illustrated in FIG. 7B. The process proceeds to Step S712 if it is determined that the counterpart has approached the interaction distance (Yes in Step S94), and proceeds to Step S709 if it is determined that the counterpart has not approached the interaction distance (No in Step S94).

If it is determined that the counterpart has approached the interaction distance (Yes in Step S94), the vibration unit 2 notifies the user 90 of the spatial distance to the counterpart and the position of the counterpart by a vibration (S712). Specifically, the vibration unit 2 notifies the user 90 of the position of the counterpart and that the counterpart is at the interaction distance by vibrating in a fourth vibration pattern.

Next, the controller 4 executes the post-interaction processing, for example, after the user 90 finishes communicating with the counterpart (S713).

If it is determined in Step S94 that the counterpart has not approached the interaction distance (No in Step S94), the motion determination unit 47 determines the motion of the counterpart based on the captured image (S709). Next, the voice output unit 1 notifies the user 90 of motion information related to the motion determined by the motion determination unit 47 in Step S709 by a voice (S710).

Figure 13:
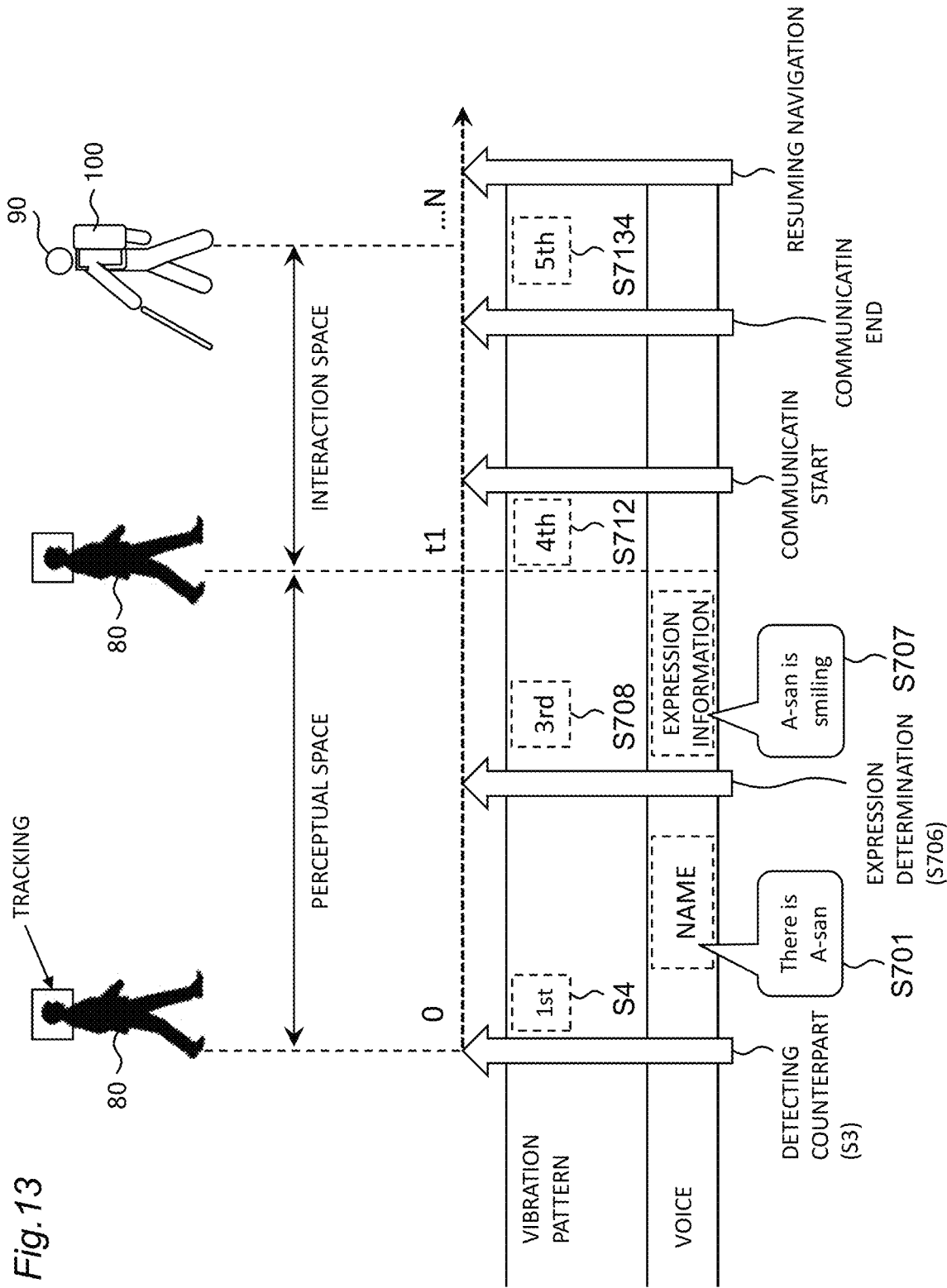
FIG. 13 is a schematic view illustrating an example of an operation including the medium distance flow of the communication support device according to the embodiment.

FIG. 13 is a schematic view illustrating an example of an operation of the communication support device 100 when the detected spatial distance to the counterpart 80 is the perceptual distance (Yes in Step S8 of FIG. 5). When compared with the schematic view in the case of the observation distance illustrated in FIG. 11, Step S710 of notifying the motion of the counterpart by the voice is particularly omitted in FIG. 13. If Step S710 of notifying the motion of the counterpart by the voice is executed when the counterpart approaches the interaction distance, the user is likely to pass and fail to smoothly communicate with the counterpart during the notification. Therefore, Step S710 is omitted in the medium distance flow S9 depending on the distance to the counterpart. However, in the medium distance flow S9, the controller 4 additionally executes the motion determination processing step S709 as described above when, for example, the counterpart stays at the perceptual distance without approaching the interaction distance. As a result, the communication support device 100 also provides the user 90 with the motion information depending on a situation, even when the counterpart has been detected for the first time at the perceptual distance. The user 90 can smoothly communicate with the counterpart by receiving sufficient information according to the situation.

3-2-4. Short Distance Flow

Figure 14:
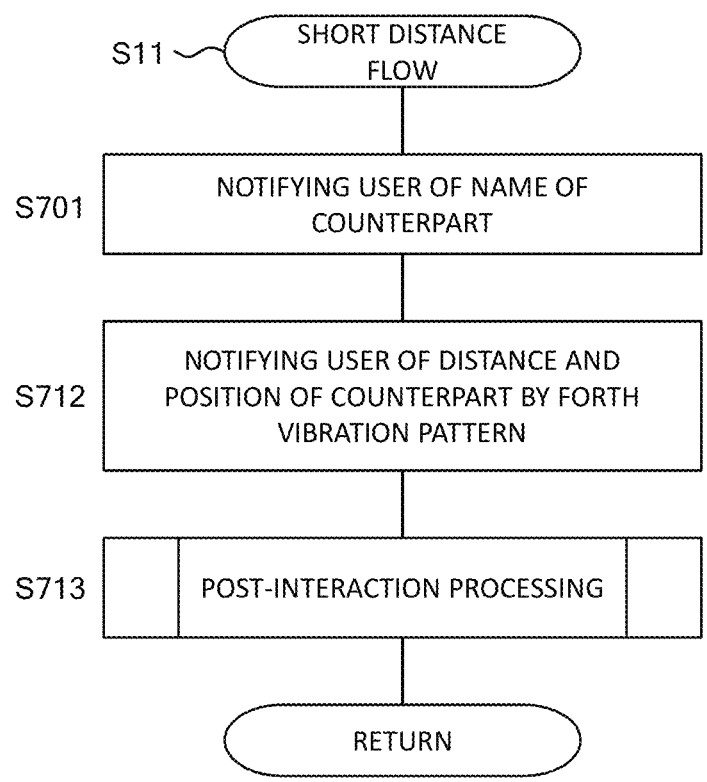
FIG. 14 is a flowchart illustrating a detailed flow of a short distance flow illustrated in FIG. 5.

FIG. 14 is a flowchart illustrating a detailed flow of the short distance flow S11 illustrated in FIG. 5. In the short distance flow S11, the same or similar steps as those described in the above-described long distance flow S7 are denoted by the same reference signs. As such steps, the short distance flow S11 includes Steps S701, S712, and S713. Duplicate descriptions are sometimes omitted for such steps.

In the short distance flow S11, first, the voice output unit 1 notifies the user 90 of the name of the counterpart detected in Step S105 by the voice (S701). Next, the vibration unit 2 notifies the user 90 of a spatial distance to the counterpart and a position of the counterpart by a vibration (S712). Specifically, the vibration unit 2 notifies the user 90 of the position of the counterpart and that the counterpart is at the interaction distance by vibrating in a fourth vibration pattern. Next, the controller 4 executes the post-interaction processing, for example, after the user 90 finishes communicating with the counterpart (S713).

Figure 15:
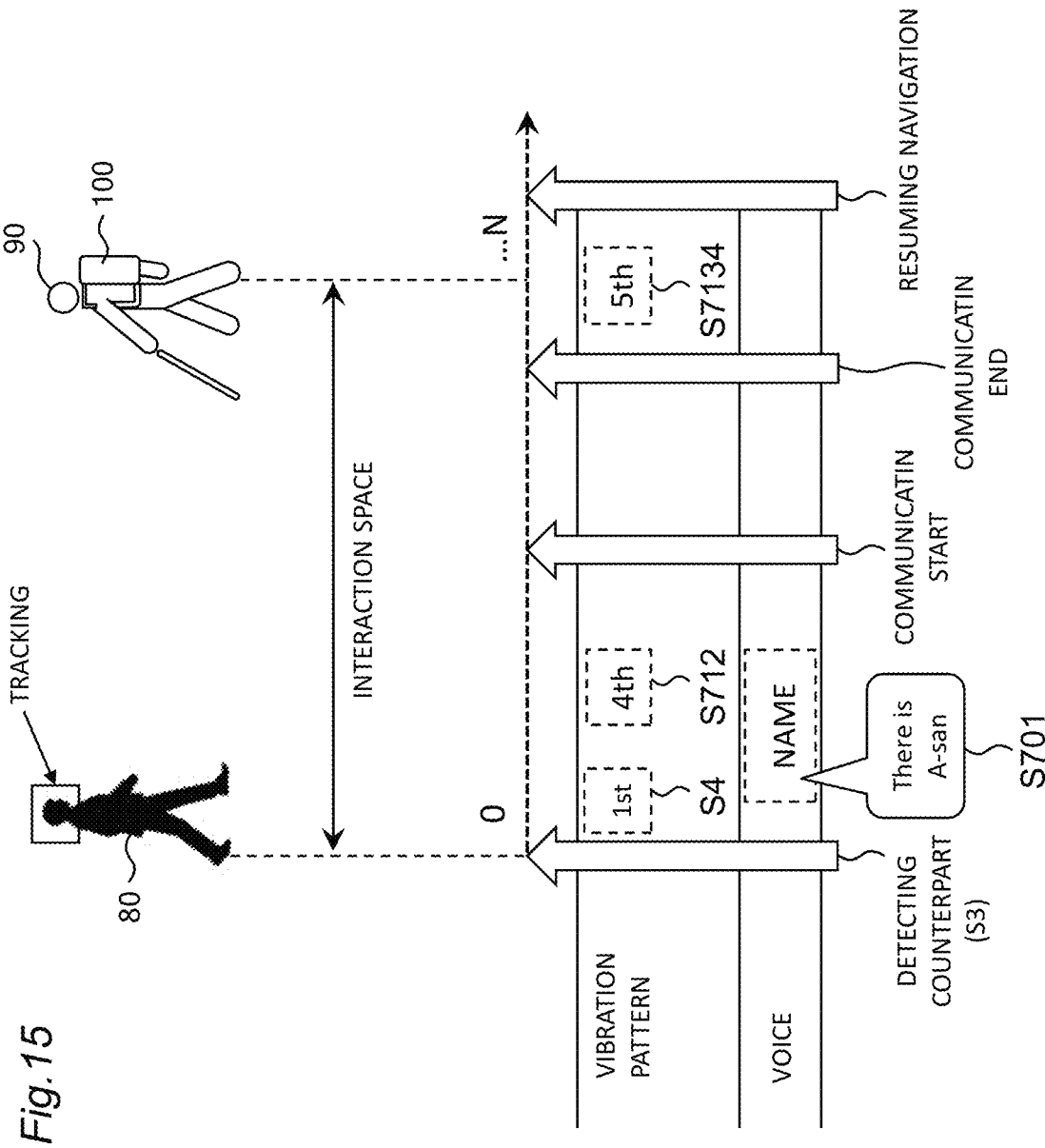
FIG. 15 is a schematic view illustrating an example of an operation including the short distance flow of the communication support device according to the embodiment.

FIG. 15 is a schematic view illustrating an example of an operation of the communication support device 100 when the detected spatial distance to the counterpart 80 is the interaction distance (Yes in Step S10 of FIG. 5). When compared with the schematic view in the case of the perceptual distance illustrated in FIG. 13, particularly, Step S707 of notifying the facial expression of the counterpart by the voice is further omitted in FIG. 15. When the counterpart is found at a short distance such as the interaction distance, the user 90 can immediately start communicating with the counterpart. In such a case, there is no time to notify the user 90 of a lot of information such as the facial expression and the motion of the counterpart by the voice or vibration, and smooth communication is normally difficult if the user 90 is notified of such information. Therefore, in the short distance flow S11, the communication support device 100 notifies the user 90 of only the minimum information such as the name, the distance, and the position of the counterpart to achieve the smooth communication between the user 90 and the counterpart.

Figure 16:
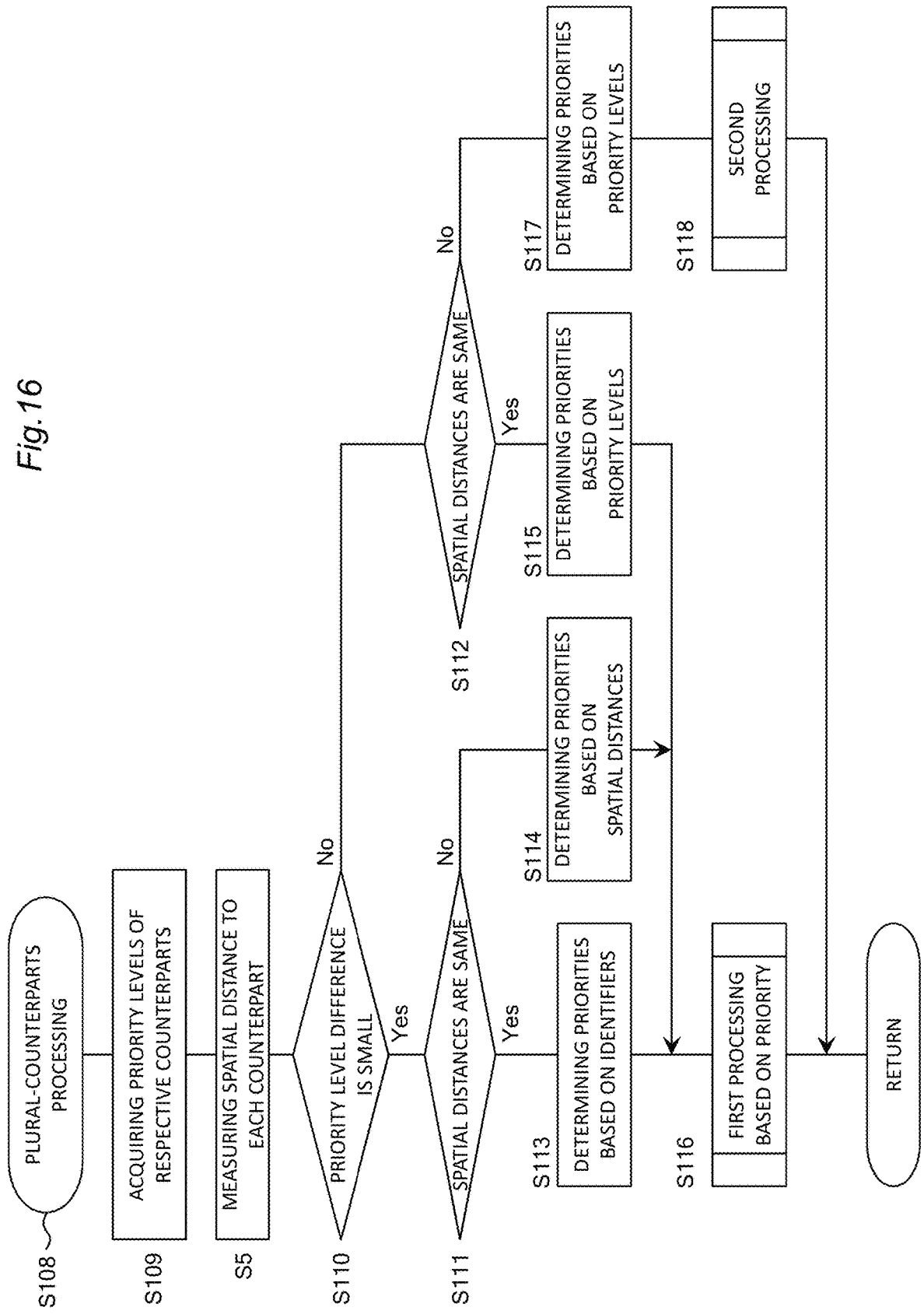
FIG. 16 is a flowchart illustrating a detailed flow of a plural-counterparts processing step illustrated in FIG. 4.

3-3. Plural-Counterparts Processing 3-3-1. Overall Flow of Plural-Counterparts Processing FIG. 16 is a flowchart illustrating a detailed flow of the plural-counterparts processing step S108 illustrated in FIG. 4.

(Step S109)

The controller 4, for example, the counterpart detector 42 acquires priority levels of the respective counterparts detected in Step S106 of FIG. 4 from the counterpart database 51 (S109).

(Step S5)

Next, the distance measuring unit 45 detects a spatial distance between the camera 3 and each counterpart as in Step S5 illustrated in FIG. 5 based on the information detected in Step S104 in FIG. 4, for example. Note that Step S5 is executed after Step S109 in FIG. 16, but the present embodiment is not limited thereto, and Step S5 may be executed before Step S109.

(Step S110)

Next, the priority determination unit 48 determines whether or not a difference in the priority level between the respective counterparts acquired in Step S109 is small (S110). For example, the priority determination unit 48 determines that the difference in the priority level is small in a case where the priority level of each of the counterparts is within a predetermined range, a case where a difference between the maximum value and the minimum value of priority levels of the plurality of counterparts is less than a predetermined threshold, or the like.

(Step S111)

When it is determined in Step S110 that the difference in the priority level between the respective counterparts is small (Yes in Step S110), the priority determination unit 48 determines whether spatial distances of the respective counterparts with respect to the camera 3 are the same (S111). For example, in a case where the spatial distances of the plurality of counterparts with respect to the camera 3 measured in Step S5 belong to the same category (for example, in a case where all of the plurality of counterparts are present in any of an observation space, a perception space, and an interaction space), the priority determination unit 48 determines that the spatial distances of the respective counterparts with respect to the camera 3 are the same. Alternatively, the priority determination unit 48 may determine that the spatial distances of the respective counterparts with respect to the camera 3 are the same in a case where each of the counterparts is present within a predetermined range, a case where a difference between the maximum value and the minimum value of the distances of the respective counterparts with respect to the camera 3 is less than a predetermined threshold, or the like.

(Step S112)

When it is not determined in Step S110 that the difference in the priority level between the respective counterparts is small (No in Step S110), the priority determination unit 48 determines whether spatial distances of the respective counterparts with respect to the camera 3 are the same (S112). The determination processing in Step S112 may be the same processing as that in Step S111.

(Step S113)

When it is determined that the difference in the priority level between the respective counterparts is small and the spatial distances of the respective counterparts with respect to the camera 3 are the same (Yes in Step S111), the priority determination unit 48 determines priorities of the plurality of counterparts based on identifiers respectively assigned in advance to the plurality of counterparts (S113).

Here, the "identifier" represents a code that enables a specific object or object concept to be determined or identified from the others. In Step S113, the priority determination unit 48 determines the priorities of the plurality of counterparts, for example, according to an order of the identifiers. The order of the identifiers is, for example, an order determined by rules such as alphabetical order and a syllabary order for family names of the plurality of counterparts. Alternatively, the order of the identifiers is, for example, an order determined by an identification number (ID) assigned to each counterpart. Such an ID is stored, for example, in the counterpart database 51 in association with information regarding each counterpart such as a name (see FIG. 3). The identifier for the information regarding each counterpart may be provided by an identifier assigning unit (not illustrated) of the controller 4.

(Step S114)

When it is determined that the difference in the priority level between the respective counterparts is small and the spatial distances of the respective counterparts with respect to the camera 3 are not the same (No in Step S111), the priority determination unit 48 determines priorities of the plurality of counterparts based on the spatial distances of the counterparts with respect to the camera 3 (S114). For example, the priority determination unit 48 sets a higher priority for a counterpart closer to the camera 3. Alternatively, the priority determination unit 48 may assign a high priority to a counterpart in the interaction space, assign a medium priority to a counterpart in the perception space, and assign a low priority to a counterpart in the observation space by using the position of the camera 3 as a reference.

(Step S115)

When it is determined that the difference in the priority level between the respective counterparts is not small and the spatial distances of the respective counterparts with respect to the camera 3 are the same (Yes in Step S112), the priority determination unit 48 determines priorities of the plurality of counterparts based on the priority levels of the counterparts (S115). For example, the priority determination unit 48 assigns a higher priority to a counterpart having a higher priority level.

(Step S116)

After Step S113, S114, or S115, the controller 4 executes a first processing step S116 based on the priority. Details of Step S116 will be described later.

(Steps S117 and S118)

Even when it is determined that the difference in the priority level between the respective counterparts is not small and the spatial distances of the respective counterparts with respect to the camera 3 are not the same (No in Step S112), the priority determination unit 48 determines priorities of the plurality of counterparts based on the priority levels of the counterparts (S117). Steps S115 and S117 may be executed before Step S112. After Step S117, the controller 4 executes a second processing step S118. Details of Step S118 will be described later.

The above Steps S110 to S112 are not necessarily executed in the order in FIG. 16, and may be executed so as to obtain a combination of the difference in the priority level between the respective counterparts and the result regarding whether or not the spatial distances are the same. For example, the priority determination unit 48 may determine a priority based on a distance measured by the distance measuring unit 45. For example, when there is no difference between priorities of the plurality of counterparts determined by the priority determination unit 48 in this manner, the priority determination unit 48 may determine priorities of the plurality of counterparts based on identifiers assigned in advance to the plurality of counterparts, respectively.

3-3-2. First Processing Based on Priority

Figure 17:
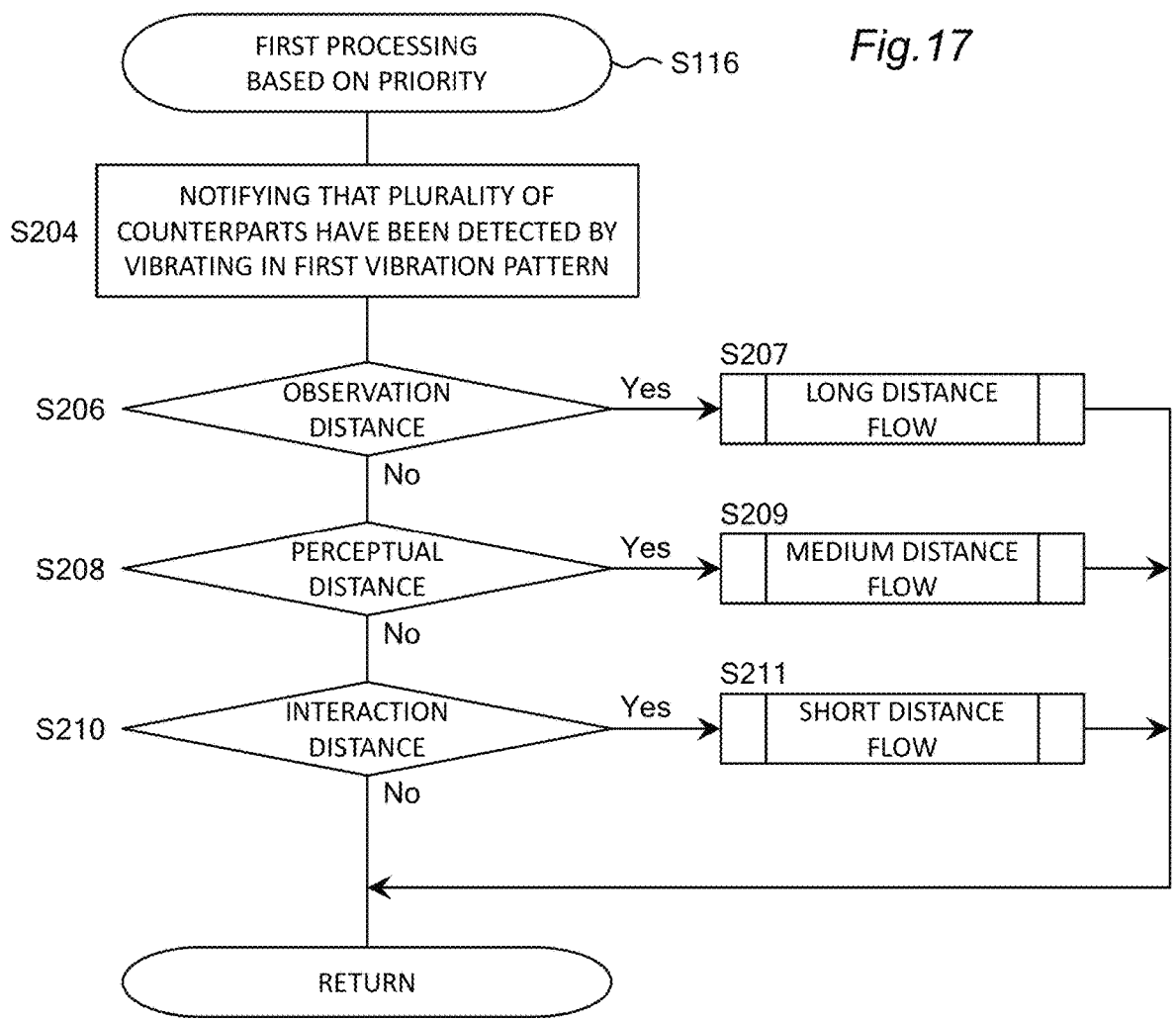
FIG. 17 is a flowchart illustrating a detailed flow of a first processing step based on a priority illustrated in FIG. 16.

FIG. 17 is a flowchart illustrating a detailed flow of the first processing step S116 based on the priority illustrated in FIG. 16.

(Step S204)

First, the vibration unit 2 notifies the user 90 of detection of a plurality of counterparts by a vibration (S204). Specifically, the vibration unit 2 notifies the user 90 that the plurality of counterparts have been detected by repeating a vibration according to a first vibration pattern a plurality of times. The number of times the first vibration pattern is executed in Step S204 is, for example, twice. That is, the vibration unit 2 executes the vibration according to the first vibration pattern once as in Step S4 illustrated in FIG. 5 when only one counterpart is detected, and may execute the vibration according to the first vibration pattern twice when a plurality of counterparts is detected. As a result, the user 90 can recognize that the plurality of counterparts are present in the periphery.

Alternatively, when n counterparts are detected, the vibration unit 2 may execute the vibration according to the first vibration pattern n times. Here, n is an integer of two or more. As a result, the user 90 can recognize the number of the counterparts in addition to the fact that the plurality of counterparts are present in the periphery. When n is too large (for example, n>10), there is a case where it is insufficient to transmit information by a vibration. In such a case, the vibration unit 2 may perform the vibration according to the first vibration pattern m times, which is a predetermined upper limit value. Here, m is an integer of two or more and less than n.

(Steps S206 to S211)

The controller 4 proceeds to Step S207 to execute a long distance flow if it is determined that the spatial distance between the camera 3 and the counterpart is the observation distance as a result of the measurement in Step S5 of FIG. 16 (Yes in Step S206). In the case of the perceptual space (Yes in Step S208), the controller 4 proceeds to Step S209 to execute a medium distance flow. In the case of the interaction space (Yes in Step S210), the controller 4 proceeds to Step S211 to execute a short distance flow In this manner, the communication support device 100 executes different processes according to the spatial distance between the camera 3 and the counterpart al the timepoint when the counterpart is found in Step S105 of FIG. 4.

In Steps S206 to S210, the spatial distance between the camera 3 and the counterpart may represent a spatial distance between the camera 3 and a counterpart having the highest priority among the plurality of counterparts. The spatial distance between the camera 3 and the counterpart may represent, for example, a spatial distance between the camera 3 and a counterpart closest to the camera 3 among the plurality of counterparts, or a spatial distance between the camera 3 and a counterpart farthest from the camera 3 among the plurality of counterparts. Alternatively, the spatial distance between the camera 3 and the counterpart may be determined based on an average value of distances of the counterparts with respect to the camera 3.

3-3-2-1. Long Distance Flow

Figure 18A:
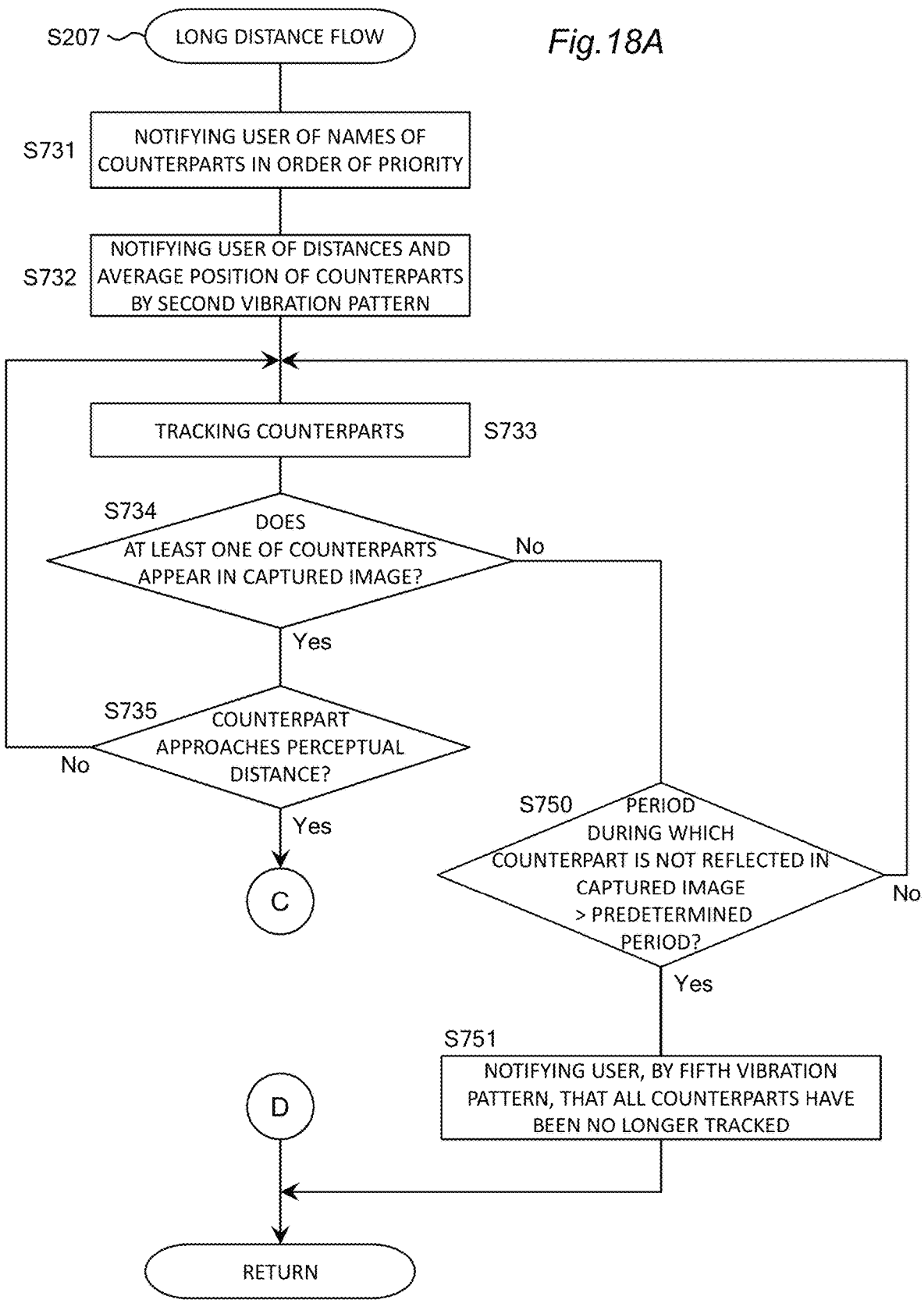
FIG. 18A is a flowchart illustrating a detailed flow of a long distance flow illustrated in FIG. 17.

FIGS. 18A and 18B are flowcharts illustrating a detailed flow of the long distance flow S207 illustrated in FIG. 17. FIGS. 18A and 18B are connected by connector C and connector D. The flow illustrated in FIGS. 18A and 18B may be executed in real time, that is, every time the image acquisition unit 41 acquires an image. Alternatively, the flow illustrated in FIGS. 18A and 18B may be executed for captured images of a plurality of frames acquired by the image acquisition unit 41 for a few seconds to a few tens of seconds.

(Step S731)

First, the voice output unit 1 notifies the user 90 of names of the plurality of counterparts detected in Step S105 of FIG. 4 by a voice in the order of the priority determined in Steps S113, S114, or S115 of FIG. 16 (S731). As a result, the user 90 can know the names of the plurality of counterparts in the periphery in order of importance.

In a case where the number of detected counterparts is excessively large, for example, in a case where the number is five or more, ten or more, or the like, there is a possibility that the user 90 passes the counterparts during reading of the names of all the counterparts and is not capable of smooth communication. Therefore, an upper limit value of the number of counterparts to be notified may be determined to be N in advance. Here, N is a positive integer such as two, three, four, or the like. For example, in Step S731, the voice output unit 1 notifies the user 90 of a name of a counterpart with the N-th priority or lower by the voice. As a result, it is possible to perform adjustment by reducing the time required for the notification or the like, and to achieve smooth communication between the user 90 and the counterpart.

(Step S732)

Next, the vibration unit 2 notifies the user 90 of spatial distances to the counterparts and an average position of the counterparts by a vibration (S732). Specifically, the vibration unit 2 notifies the user 90 of the average position of the counterparts and that the counterparts are at the observation distance by vibrating in a second vibration pattern. The average position of the counterparts is, for example, an average position or a center position of the positions of the counterparts. The spatial distance is the one measured by the distance measuring unit 45 in Step S5 of FIG. 16. The position of each of the counterparts is detected by the position detector 44, for example, as described in Step S702 with reference to FIG. 7A.

(Step S733)

Next, the counterpart tracker 43 tracks the plurality of counterparts detected in Step S105 of FIG. 4 (S733). A tracking method is, for example, similar to that described in Step S702 with reference to FIG. 7A.

(Step S734)

The counterpart tracker 43 determines whether or not at least one of the plurality of counterparts detected or tracked in the tracking processing is reflected in the captured image (S734). For example, the counterpart tracker 43 determines whether or not at least one of the plurality of counterparts is reflected in a current frame. The processing proceeds to Step S735 if it is determined that at least one of the plurality of counterparts is reflected in the captured image (Yes in Step S734), and proceeds to Step S750 if it is determined that no counterpart s reflected (No in Step S734).

(Step S735)

The distance measuring unit 45 determines whether or not the counterpart has approached the perceptual distance (S735). Specifically, the distance measuring unit 45 determines whether or not the counterpart who was at the observation distance in the frame used in Step S5 of FIG. 16 is at the perceptual distance in a frame captured at the subsequent timing. The processing proceeds to Step S736 in FIG. 18B if the counterpart approaches the perceptual distance (Yes in Step S735), and returns to Step S733 if the counterpart has not approached the perceptual distance (No in Step S735). If the counterpart has not approached the perceptual distance, the controller 4 may end the processes of FIGS. 18A and 17.

(Step S736)

In Step S736 illustrated in FIG. 18B, the expression determination unit 46 determines a facial expression of each of the plurality of counterparts based on the captured image similarly to Step S706 (S736).

(Step S737)

Next, the voice output unit 1 notifies the user 90 of facial expression information related to the facial expression determined by the expression determination unit 46 in Step S736 by a voice (S737). The facial expression information reported here may be obtained by averaging pieces of facial expression information regarding the plurality of counterparts. For example, the expression determination unit 46 obtains an average of pieces of the facial expression information regarding the plurality of counterparts by expressing the facial expression information such as "smiling", "angry", "expressionless (neutral expression)", "expression is unknown", or "wearing a mask" by a numerical value or a vector. The expression determination unit 46 may omit facial expression information of a counterpart wearing a shielding object such as a mask and average only pieces of facial expression information of counterparts not wearing the shielding object.

(Step S738)

Next, the vibration unit 2 notifies the user 90 of spatial distances to the counterparts and an average position of the counterparts by a vibration (S738). Specifically, the vibration unit 2 notifies the user 90 of the average position of the counterparts and that the counterparts are at the perceptual distance by vibrating in a third vibration pattern.

(Step S739)

Next, the motion determination unit 47 determines motions of the plurality of counterparts based on the captured image (S739). In the motion determination processing step S739, the same processing as that in the motion determination processing step S709 may be executed. Alternatively, in Step S739, which is the internal processing of the plural-counterparts processing step S108, the motion determination unit 47 may detect whether or not at least one of the counterparts is looking at the user 90 (see Step S7091 in FIG. 9) and determine that the counterpart is looking at the user 90 based on the motion of the counterpart.

(Step S740)

Next, the voice output unit 1 notifies the user 90 of motion information related to the motion determined by the motion determination unit 47 in Step S739 by a voice (S740). For example, the voice output unit 1 notifies the user 90 of motion information such as "the counterpart is looking here" and "the counterpart is not looking here". As a result, the user 90 can know whether or not the counterpart is looking here, and can smoothly communicate with the counterpart.

(Step S741)

Next, the distance measuring unit 45 determines whether or not the counterparts have approached the interaction distance (S741). Specifically, the distance measuring unit 45 determines whether or not the counterparts who were at the perceptual distance in the frame used in Step S735 of FIG. 18A is at the interaction distance in a frame captured at the subsequent timing. The processing proceeds to Step S742 of FIG. 18B if the counterparts approach the interaction distance (Yes in Step S741), and returns to Step S739 if the counterparts have not approached the interaction distance (No in Step S741). If the counterpart has not approached the interaction distance, the controller 4 may end the processes of FIGS. 18B and 17.

(Step S742)

Next, the vibration unit 2 notifies the user 90 of spatial distances to the counterparts and an average position of the counterparts by a vibration (S742). Specifically, the vibration unit 2 notifies the user 90 of the average position of the counterparts and that the counterparts are at the interaction distance by vibrating in a fourth vibration pattern. As a result, the user 90 can know that the counterpart is at the interaction distance and can start communication with the counterpart.

(Step S743)

After Step S742, the controller 4 executes post-interaction processing, for example, after the user 90 finishes communicating with the counterpart, (S743). For example, the controller 4 controls the vibration unit 2 to notify that all the counterpart have left the user 90 by a vibration. As a result, the user 90 can know that the counterpart has left, and can resume an action such as moving to a destination that has been taken before the communication with the counterpart.

The post-interaction processing step S743 may be the same processing as the post-interaction processing step S713 illustrated in FIG. 10. However, a plurality of counterparts are tracked in the post-interaction processing step S743 in the plural-counterparts processing step S108, which is different from the post-interaction processing step S713 in the single-counterpart processing step S107.

(Step S750)

Returning to FIG. 18A, if it is determined in Step S734 that at least one counterpart is not reflected in the captured image, the controller 4 determines whether or not a period. during which the counterpart is not reflected in the captured image is longer than a predetermined period (S750). In Step S750, the same processing as that in Step S720 illustrated in FIG. 7A may be executed. The processing proceeds to Step S751 if the period during which the counterpart is not reflected in the captured image is longer than the predetermined period (Yes in Step S750), and returns to Step S733 if the period is the predetermined period or less (No in Step S750).

(Step S751)

If the period during which the counterpart is not reflected in the captured image is longer than the predetermined period (Yes in Step S750), the vibration unit 2 notifies the user 90 that all the counterparts have been no longer tracked by a vibration (S751). Specifically, the vibration unit 2 notifies the user 90 that all the counterpart have been no longer tracked by vibrating in a fifth vibration pattern. As a result, the user 90 can know that all the counterparts have been no longer tracked or that all the counterparts have left the periphery of the user 90. After Step S751, the components such as the controller 4 and the notification remit 10 may resume a navigation operation to a destination or the like, which is a normal operation performed before the detection of the counterpart, for the user 90.

3-3-2-2. Medium Distance Flow

Figure 19:
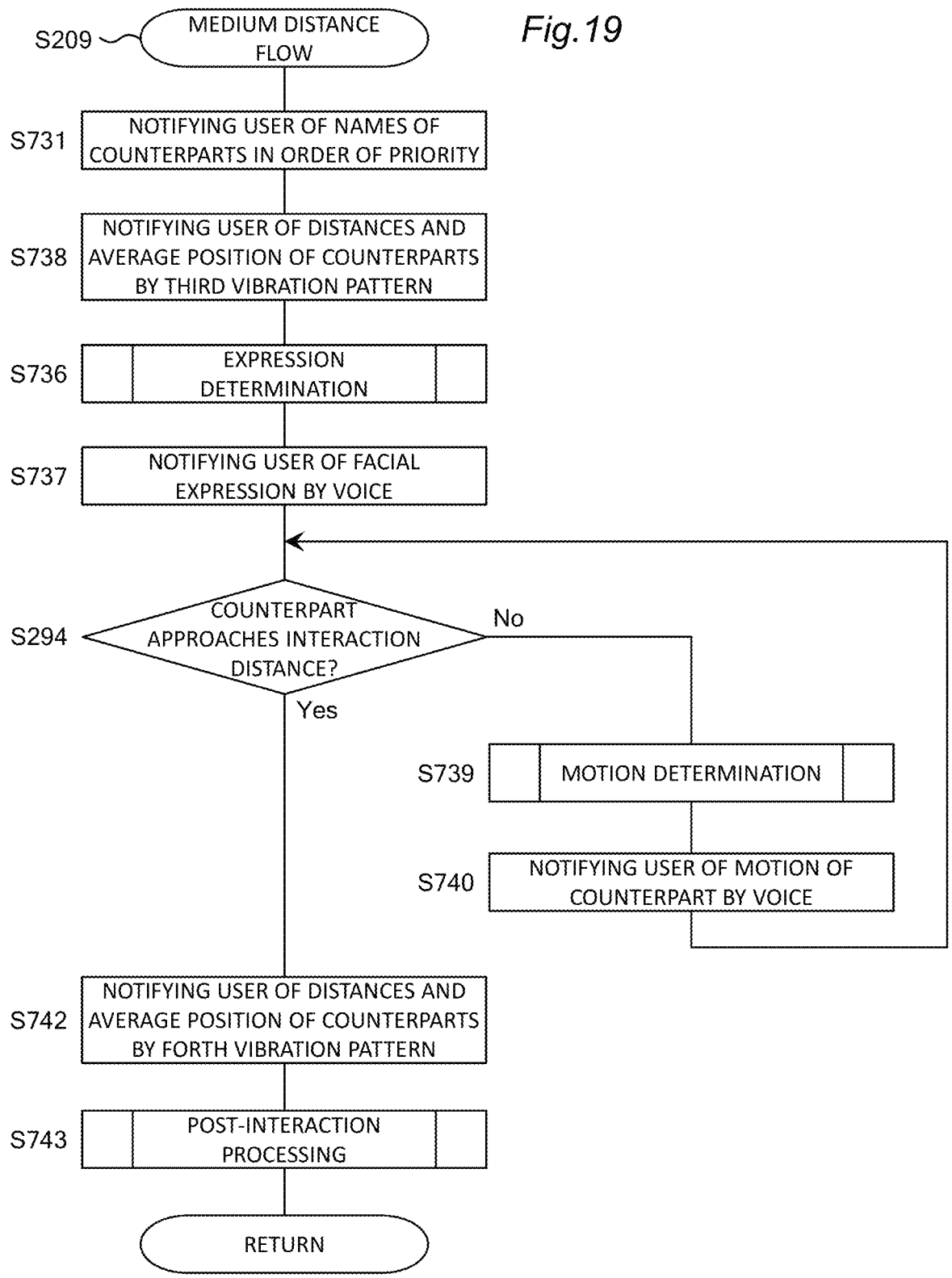
FIG. 19 is a flowchart illustrating a detailed flow of a medium distance flow illustrated in FIG. 17.

FIG. 19 is a flowchart illustrating a detailed flow of the medium distance flow S209 illustrated in FIG. 17. In the medium distance flow S209, the same or similar steps as those described in the above-described long distance flow S207 are denoted by the same reference signs. As such steps, the medium distance flow S209 includes Steps S731, S736 to S740, S742, and S743. Duplicate descriptions are sometimes omitted for such steps. The medium distance flow S209 illustrated in FIG. 19 may be the same processing as the medium distance flow S9 illustrated in FIG. 12. However, a plurality of counterparts are set as processing targets in the medium distance flow S209 in the plural-counterparts processing step S108, which is different from the medium distance flow S9 in the single-counterpart processing step S107.

In the medium distance flow S209, first, the voice output unit 1 notifies the user 90 of names of the plurality of counterparts detected in Step S105 of FIG. 4 by a voice in the order of the priority determined in Steps S113, S114, or S115 of FIG. 16 (S731). Next, the vibration unit 2 notifies the user 90 of spatial distances to the counterparts and an average position of the counterparts by a vibration (S738). Specifically, the vibration unit 2 notifies the user 90 of the average position of the counterparts and that the counterparts are at the perceptual distance by vibrating in a third vibration pattern.

Next, the expression determination unit 46 determines a facial expression of each of the plurality of counterparts based on the captured image (S736). Next, the voice output unit 1 notifies the user 90 of facial expression information related to the facial expression determined by the expression determination unit 46 in Step S736 by a voice (S737). The facial expression determination processing step S736 may be executed before Step S731 of notifying the names of the counterparts.

Next, the distance measuring unit 45 determines whether or not the counterparts have approached the interaction distance (S294). Step S294 may be the same step as the above-described Step S741 illustrated in FIG. 7B. The processing proceeds to Step S742 if it is determined that the counterparts have approached the interaction distance (Yes in Step S294), and proceeds to Step S739 if it is determined that the counterparts have not approached the interaction distance (No in Step S294).

If it is determined that the counterparts have approached the interaction distance (Yes in Step S294), the vibration unit 2 notifies the user 90 of the spatial distances to the counterparts and the average position of the counterparts by a vibration (S742). Specifically, the vibration unit 2 notifies the user 90 of the average position of the counterparts and that the counterparts are at the interaction distance by vibrating in a fourth vibration pattern.

Next, the controller 4 executes the post-interaction processing, for example, after the user 90 finishes communicating with the counterparts (S743).

If it is determined in Step S294 that the counterparts have not approached the interaction distance (No in Step S294), the motion determination unit 47 determines motions of the plurality of counterparts based on the captured image (S739). Next, the voice output unit 1 notifies the user 90 of motion information related to the motions determined by the motion determination unit 47 in Step S739 by a voice (S740).

3-3-2-3. Short Distance Flow

Figure 20:
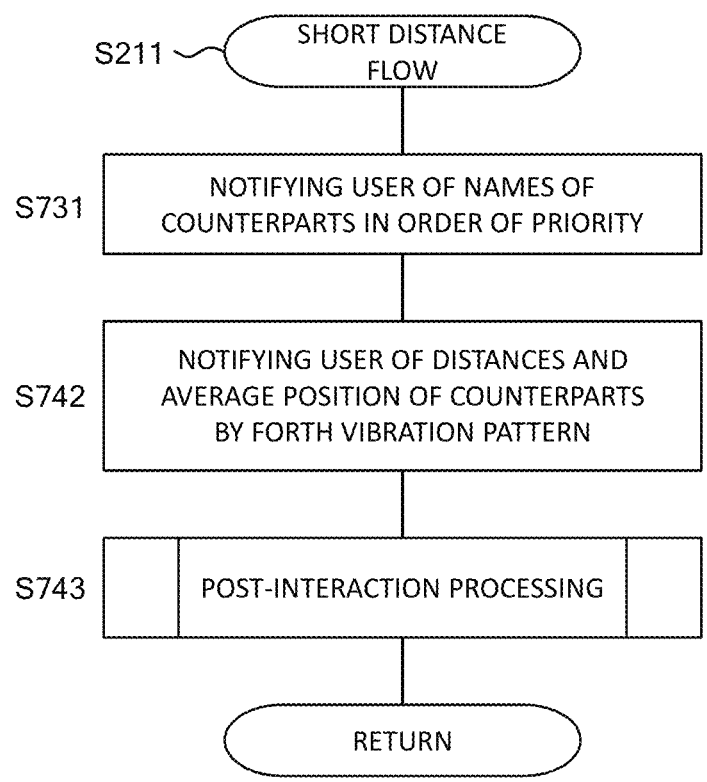
FIG. 20 is a flowchart illustrating a detailed flow of a short distance flow illustrated in FIG. 17.

FIG. 20 is a flowchart illustrating a detailed flow of the short distance flow S211 illustrated in FIG. 17. In the short distance flow S211, the same or similar steps as those described in the above-described long distance flow S207 are denoted by the same reference signs. As such steps, the short distance flow S211 includes Steps S731, S742, and S743. Duplicate descriptions are sometimes omitted for such steps. The short distance flow S211 illustrated in FIG. 20 may be the same processing as the short distance flow S11 illustrated in FIG. 14. However, a plurality of counterparts are set as processing targets in the short distance flow S211 in the plural-counterparts processing step S108, which is different from the short distance flow S11 in the single-counterpart processing step S107.

In the short distance flow S211, first, the voice output unit 1 notifies the user 90 of names of the plurality of counterparts detected in Step S105 of FIG. 4 by a voice in the order of the priority determined in Steps S113, S114, or S115 of FIG. 16 (S731). Next, the vibration unit 2 notifies the user 90 of spatial distances to the counterparts and an average position of the counterparts by a vibration (S742). Specifically, the vibration unit 2 notifies the user 90 of the average position of the counterparts and that the counterparts are at the interaction distance by vibrating in a fourth vibration pattern. Next, the controller 4 executes the post-interaction processing, for example, after the user 90 finishes communicating with the counterparts (S743).

3-3-3. Second Processing

Figure 21:
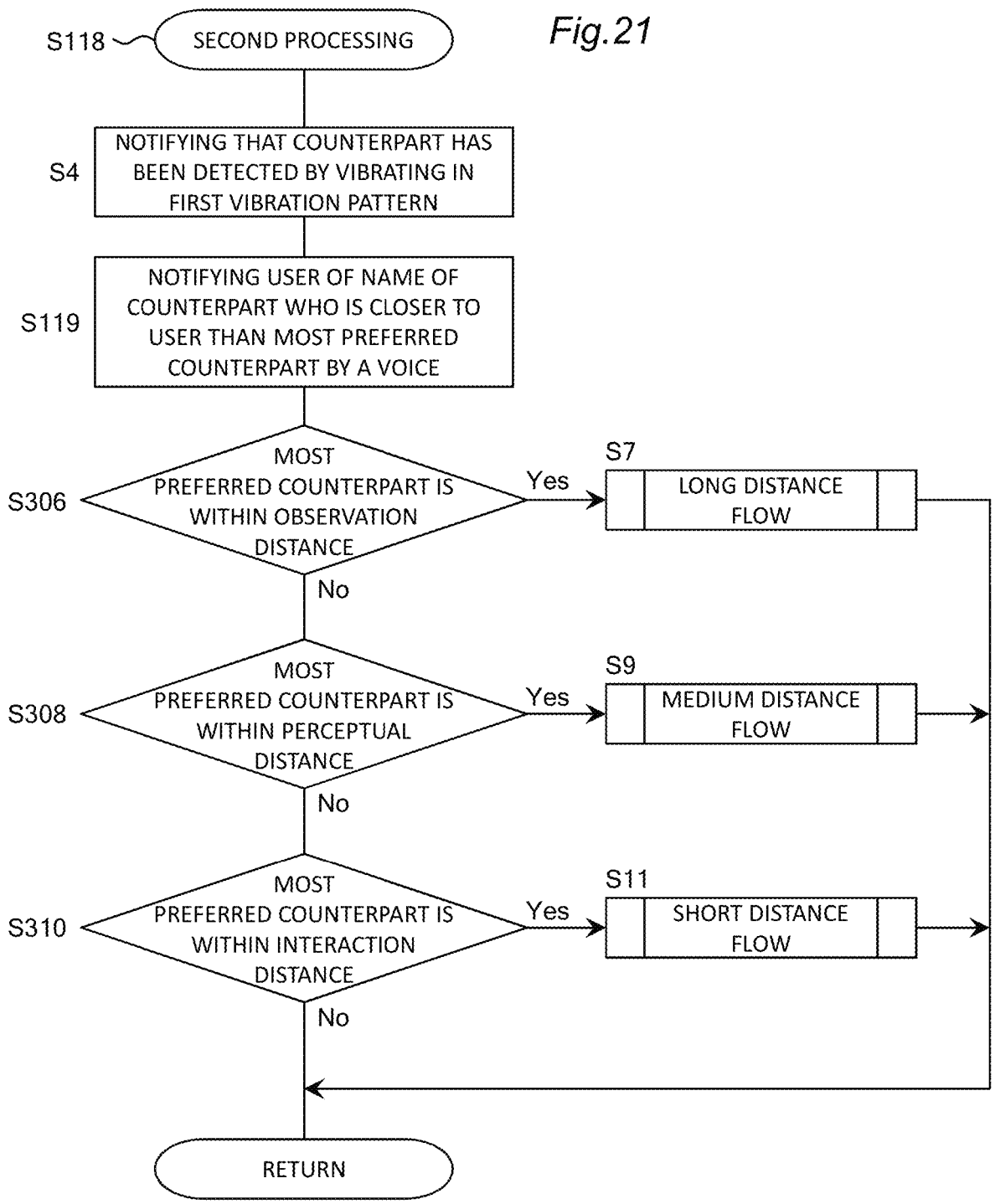
FIG. 21 is a flowchart illustrating a detailed flow of a second processing step illustrated in FIG. 16.

FIG. 21 is a flowchart illustrating a detailed flow of the second processing step S118 illustrated in FIG. 16.

First, the vibration unit 2 notifies the user 90 of detection of counterparts by a vibration (S4). Specifically, the vibration unit 2 notifies the user 90 that the counterpart has been detected by vibrating in a first vibration pattern. In Step S4 of FIG. 21, the vibration according to the first vibration pattern is not necessarily repeated a plurality of times, which is different from Step S204 illustrated in FIG. 17.

Next, the voice output unit 1 notifies the user 90 of a name of a counterpart who is closer to the user 90 than the most preferred counterpart by a voice (S119). Here, the "most preferred counterpart" represents a counterpart with the first priority. The priority is, for example, the priority determined in Step S117 of FIG. 16. The voice output unit 1 may also notify a name of a counterpart at the same distance as the most preferred counterpart as viewed from the user 90. In Step S119, the notification processing is not necessarily executed if there is no counterpart closer to the user 90 than the most preferred counterpart.

In a case where the number of counterparts closer to the user 90 than the most preferred counterpart is too large, for example, in a case where the number is five or more, ten or more, or the like, there is a possibility that the user 90 passes the most preferred counterpart during reading of names of all the counterparts, and is not capable of smoothly communicating with the most preferred counterpart. Therefore, an upper limit value of the number of counterparts to be notified may be determined in advance. For example, in Step S119, the voice output unit 1 may notify the user 90 of a name of a counterpart with the M-th priority or higher other than the most preferred counterpart among the plurality of counterparts closer to the user 90 than the most preferred counterpart. Here, M is an integer of two or more. In this case, a higher priority may be set again for a person closer to the user 90 among the plurality of counterparts who are closer to the user 90 than the most preferred counterpart. Alternatively, priorities according to the order of identifiers may be set again for the plurality of counterparts closer to the user 90 than the most preferred counterpart.

For example, when it is determined that the spatial distance between the camera 3 and the most preferred counterpart is the observation distance (Yes in Step S306) as a result of the measurement in Step S5 in FIG. 16, the controller 4 executes the long distance flow S7 for the most preferred counterpart. In the case of the perception space (Yes in Step S308), the medium distance flow S9 is executed for the most preferred counterpart. In the case of the interaction space (in the case of Yes in Step S310), the short distance flow S11 is executed for the most preferred counterpart In this manner, the controller 4 executes the same processing as the single-counterpart processing step S107 for the most preferred counterpart in the second processing step S118. The controller 4 notifies a name of a counterpart other than the most preferred counterpart of when the counterpart is closer to the user 90 than the most preferred counterpart, but does not notify the name of the counterpart in the other case. In this manner, the communication support device 100 can support the user 90 to smoothly communicate with the counterpart by omitting the information to be notified regarding the counterpart with the low priority.

3-4. Example of Plural-Counterparts Processing

Figure 22:
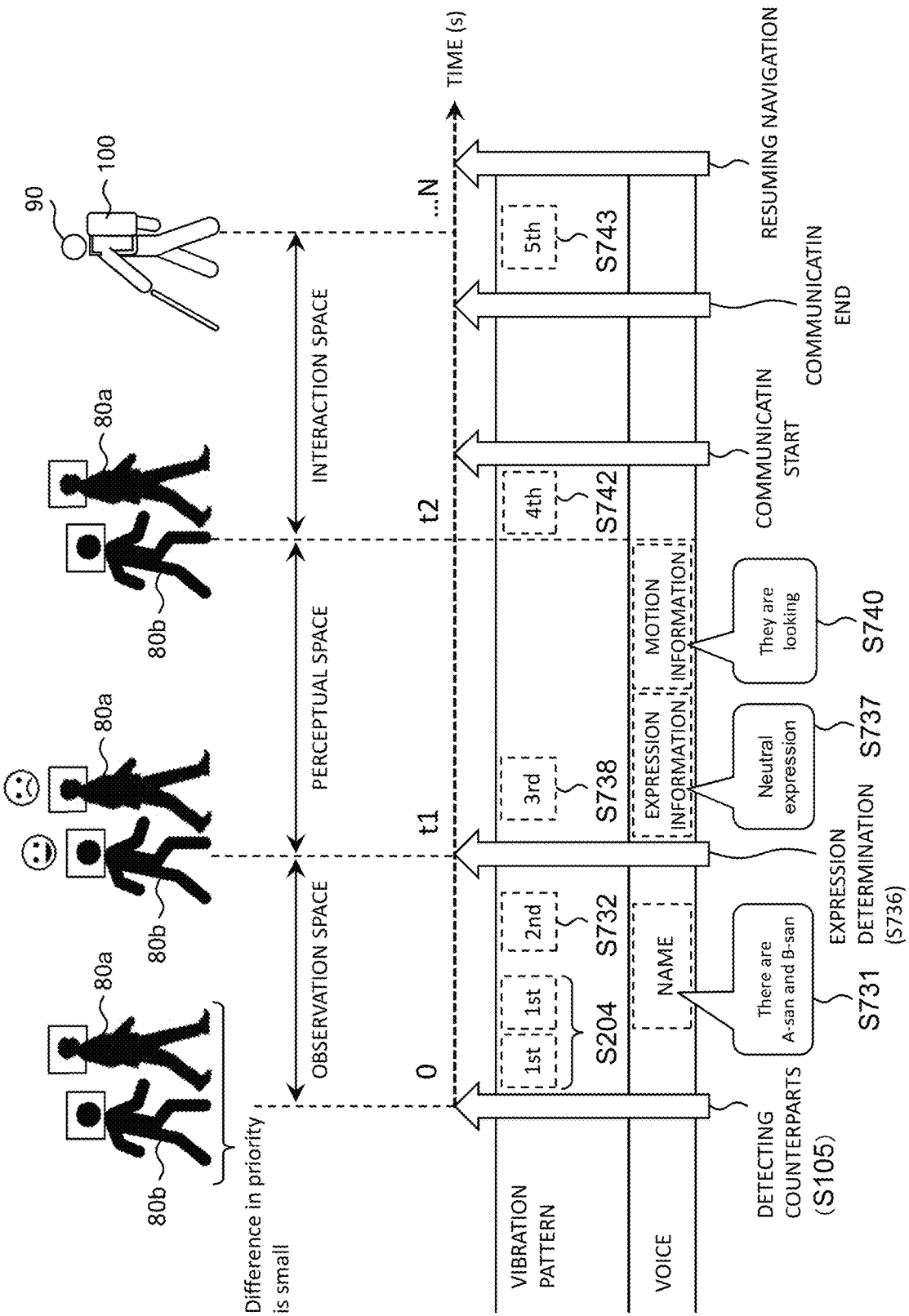
FIG. 22 is a schematic view illustrating an example of an operation including the plural-counterparts processing step of the communication support device according to the present embodiment.

FIG. 22 is a schematic view illustrating an example of the plural-counterparts processing step S108 in a specific situation. FIG. 22 illustrates a situation where it is determined that a difference between a priority level of the counterpart 80a and a priority level of the counterpart 80b is small (Yes in Step S110 in FIG. 16). In addition, since both the counterparts 80a and 80b are in the observation space, FIG. 22 illustrates a situation where spatial distance of the respective counterparts with respect to the camera 3 are the same (Yes in Step S111 in FIG. 16). Therefore, the priority determination unit 48 determines priorities of the plurality of counterparts based on the identifiers assigned in advance to the counterparts 80a and 80b (S113). In this example, it is assumed that the priority of the counterpart 80a is higher than the priority of the counterpart 80b.

In such a situation, first, the vibration unit 2 repeats the vibration according to the first vibration pattern, for example, twice to call attention to the user 90 (S204). Next, the voice output unit 1 notifies the user 90 of names of the counterparts 80a and 80b by a voice in order of priority (S731). At the same time, the vibration unit 2 notifies spatial distances of the counterparts 80a and 80b with respect to the camera 3 and an average position of the counterparts 80a and 80b by vibrating in the second vibration pattern (S732).

Thereafter, when the counterparts 80a and 80b enter the perception space, the voice output unit 1 notifies the user 90 of pieces of the facial expression information of the counterparts 80a and 80b by a voice (S737). The facial expression information reported here is, for example, an average of facial expression information of the counterpart 80a and facial expression information of the counterpart 80b. At the same time, the vibration unit 2 notifies spatial distances of the counterparts 80a and 80b with respect to the camera 3 and an average position of the counterparts 80a and 80b by vibrating in the third vibration pattern (S738). Furthermore, the voice output unit 1 notifies the user 90 of whether or not at least one of the counterparts 80a and 80b is looking at the user 90 by a voice (S740).

Thereafter, when the counterparts 80a and 80b enter the interaction space, the vibration unit 2 notifies spatial distances of the counterparts 80a and 80b with respect to the camera 3 and an average position of the counterparts 80a and 80b by vibrating in the fourth vibration pattern (S742). As a result, the user 90 can know that the counterparts 80a and 80b are at the interaction distance and can start communication with the counterparts 80a and 80b. After the user 90 finishes communicating with the counterparts 80a and 80b, for example, the vibration unit 2 notifies that both the counterparts 80a and 80b have left the user 90 by vibrating in the fifth vibration pattern (S743). Thereafter, the components such as the controller 4 and the notification unit 10 may resume a navigation operation to a destination or the like, which is a normal operation performed before the detection of the counterparts 80a and 80b, for the user 90.

4. VIBRATION PATTERN 4-1. Configuration of Vibration Unit

Figure 23:
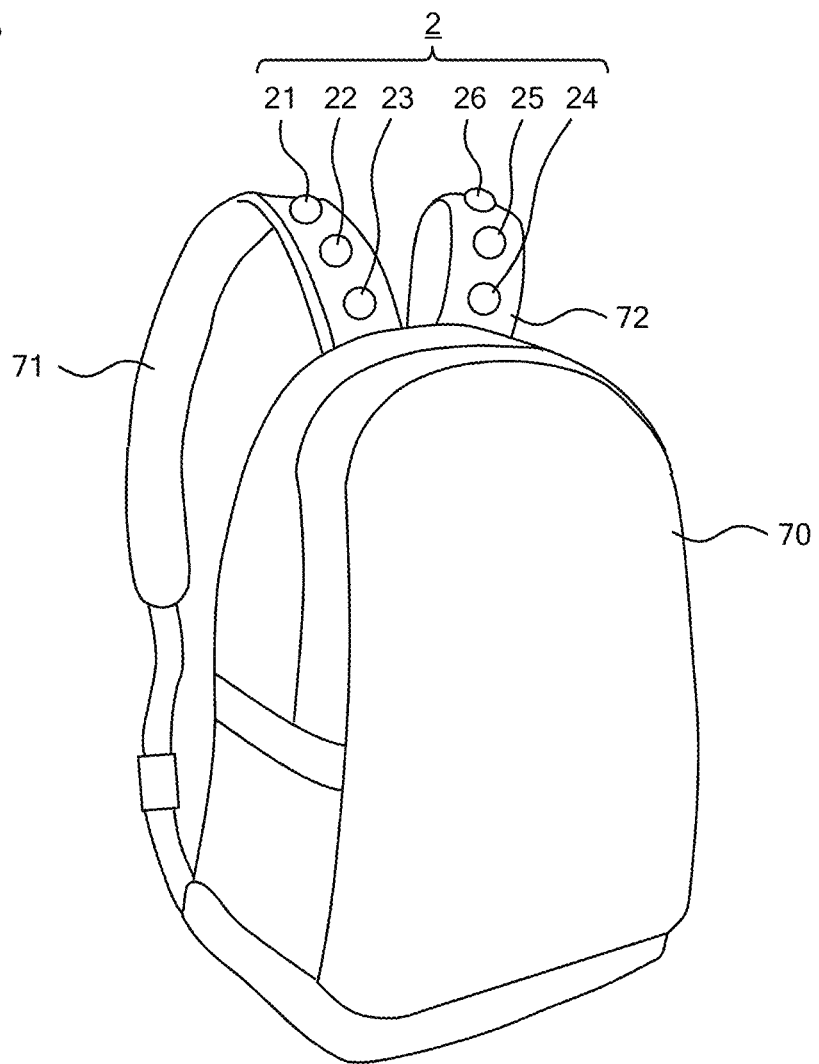
FIG. 23 is a view illustrating a configuration example of a vibration unit.

The vibration unit 2 and an example of a vibration pattern of the vibration unit 2 will be described with reference to FIG. 23. FIG. 23 is a view illustrating a configuration example of the vibration unit 2. The vibration unit 2 is attached to, for example, shoulder straps of a rucksack 70. The vibration unit 2 includes two or more vibrating elements each of which vibrates according to a control signal from the controller 4. In the example of FIG. 23, the vibration unit 2 includes first to sixth vibrating elements 21 to 26 which are regularly arranged. The first to third vibrating elements 21 to 23 are attached to a left shoulder strap 71, and the fourth to sixth vibrating elements 24 to 26 are attached to a right shoulder strap 72. The first to third vibrating elements 21 to 23 are aligned in a direction in which the left shoulder strap 71 extends. The fourth to sixth vibrating elements 24 to 26 are aligned in a direction in which the right shoulder strap 72 extends. The first to third vibrating elements 21 to 23 are examples of a "left vibrating element" of the present disclosure. The fourth to sixth vibrating elements 24 to 26 are aligned in a direction in which the right shoulder strap 72 extends. The first to third vibrating elements 21 to 23 are examples of a "right vibrating element" of the present disclosure.

4-2. First Vibration Pattern

In the above example, the first vibration pattern is a vibration pattern for notifying the user 90 that the counterpart has been detected as described in Step S4 and the like of FIG. 5. The first vibration pattern has a function of alerting the user 90.

In the first vibration pattern, the controller 4 causes the first to sixth vibrating elements 21 to 26 of the vibration unit 2 to sequentially vibrate. That is, in the first vibration pattern, the controller 4 performs control such that the first vibrating element 21, the second vibrating element 22, the third vibrating element 23, the fourth vibrating element 24, the fifth vibrating element 25, and the sixth vibrating element 26 vibrate in this order. When the rucksack 70 in a state of being carried by the user 90 is viewed from above, the first to sixth vibrating elements 21 to 26 vibrate in order counterclockwise in the first vibration pattern. The user 90 can know that the counterpart is nearby by feeling the counterclockwise vibration. This counterclockwise vibration may be executed once or a plurality of times.

4-3. Second Vibration Pattern

In the above example, the second vibration pattern is a vibration pattern for notifying the user 90 of the position of the counterpart and that the counterpart is at the observation distance as described in Step S702 and the like of FIG. 7A.

For example, each of the vibrating elements 21 to 26 of the vibration unit 2 can vibrate with three levels of vibration intensities of weak, medium, and strong. In the second vibration pattern, each of the vibrating elements 21 to 26 of the vibration unit 2 notifies the user 90 that the counterpart is at the observation distance, for example, by a weak vibration. Alternatively, the controller 4 may notify the user 90 of the position of the counterpart by changing vibrating elements such as frequencies and waveforms of the vibrations of the vibrating elements 21 to 26.

Regarding the position of the counterpart, for example, when the counterpart is on the tell side, the vibration unit 2 notifies the user 90 that the counterpart is on the left side by causing only the first to third vibrating elements 21 to 23 attached to the left shoulder strap 71 to vibrate. In addition, for example, when the counterpart is on the right side, the vibration unit 2 notifies the user 90 that the counterpart is on the right side by causing only the fourth to sixth vibrating elements 24 to 26 attached to the right shoulder strap 72 to vibrate. In addition, for example, the vibration unit 2 causes all of the first to sixth vibrating elements 21 to 26 to vibrate when the counterpart is in the front direction.

In this manner, the vibration unit 2 can notify the user 90 of both the spatial distance to the counterpart and the position of the counterpart substantially at the same time by controlling the intensity of the vibration and the position of the vibration.

4-4. Third Vibration Pattern

In the above example, the third vibration pattern is a vibration pattern for notifying the user 90 of the position of the counterpart and that the counterpart is at the perceptual distance as described in Step S708 and the like of FIG. 7B. In the third vibration pattern, each of the vibrating elements 21 to 26 of the vibration unit 2 notifies the user 90 that the counterpart is at the perceptual distance, for example, by vibrating with a medium intensity. Since the third vibration pattern is the same as the above-described second vibration pattern except that the vibration intensity is different, the duplicate description will be omitted.

4-5. Fourth Vibration Pattern

In the above example, the fourth vibration pattern is a vibration pattern for notifying the user 90 of the position of the counterpart and that the counterpart is at the interaction distance as described in Step S712 of FIGS. 5B and 10. In the fourth vibration pattern, each of the vibrating elements 21 to 26 of the vibration unit 2 notifies the user 90 that the counterpart is at the interaction distance, for example, by vibrating with a strong intensity. Since the fourth vibration pattern is the same as the above-described second vibration pattern and third vibration pattern except that the vibration intensity is different, the duplicate description will be omitted.

4-6. Fifth Vibration Pattern

In the above example, the fifth vibration pattern is a vibration pattern for notifying the user 90 that it is difficult to track the counterpart that has been tracked as described in Step S721 and the like of FIG. 7A. The fifth vibration pattern enables the user 90 to know that the counterpart has been no longer tracked or that the counterpart has left the periphery of the user 90.

In the fifth vibration pattern, the controller 4 causes the first to sixth vibrating elements 21 to 26 of the vibration unit 2 to sequentially vibrate in a different order from the first vibration pattern. For example, in the fifth vibration pattern, the controller 4 performs control such that the sixth vibrating element 26, the fifth vibrating element 25, the fourth vibrating element 24, the third vibrating element 23, the second vibrating element 22, and the first vibrating element 21 vibrate in this order. When the rucksack 70 in the state of being carried by the user 90 is viewed from above, the first to sixth vibrating elements 21 to 26 vibrate in order clockwise in the fifth vibration pattern. The user 90 can know that the counterpart has been no longer tracked or that the counterpart has left the periphery of the user 90 by feeling the clockwise vibration. This clockwise vibration may be executed once or a plurality of times.

In addition, the first to fifth vibration patterns are not limited to those described above as long as the user 90 can distinguish the first to fifth vibration patterns from each other. For example, the first to fifth vibration patterns may be patterns that vibrate in different vibration cycles.

4-7. Modification

The example in which the first to sixth vibrating elements 21 to 26 of the vibration unit 2 are attached to the shoulder straps 71 and 72 of the rucksack 70 has been described in the example of FIG. 23. However, the present disclosure is not limited thereto as long as the user 90 can distinguish the first to fifth vibration patterns from each other. For example, the first to sixth vibrating elements 21 to 26 of the vibration unit 2 may be attached to a belt, a wristband, a wristwatch, a hat, or the like of the user 90. The first to sixth vibrating elements 21 to 26 of the vibration unit 2 may be incorporated in smart wear. Here, the smart wear is, for example, a wearable device in which a sensor, an output device, and the like is provided on a wearable material such as clothing. The first to sixth vibrating elements 21 to 26 of the vibration unit 2 are incorporated into smart textiles and materials constituting the smart wear.

5. OPERATION AND EFFECT

As described above, the communication support device 100 according to the present embodiment includes the camera 3, the counterpart detector 42, the priority level setting unit 40, the priority determination unit 48, and the notification unit 10. The camera 3 captures an image of the surrounding environment of the user 90 to acquire the captured image.

The counterpart detector 42 detects a plurality of predetermined counterparts in the captured image.

The priority level setting unit 40 sets priority levels respectively for the plurality of counterparts based on a predetermined relationship between the user 90 and each of the plurality of counterparts. The priority determination unit 48 determines priorities of the plurality of counterparts based on the set priority levels. The notification unit 10 selects information regarding the plurality of counterparts based on the determined priorities and notifies the user 90 of the selected information.

The communication support device 100 can provide the user 90 with appropriate information in an appropriate order by notifying the information based on the priority when detecting the plurality of counterparts. As a result, the user 90 can receive appropriate information regarding the counterparts in a timely manner, and can smoothly communicate with the counterparts.

The priority level setting unit 40 may refer to the schedule 54 of the user 90 registered in advance, and set a higher priority to a counterpart related to the schedule 54 than the other counterpart, With this configuration, the user 90 can receive appropriate information regarding a counterpart such as a meeting-scheduled person related to the schedule 54 in a timely manner, and can smoothly communicate with the counterpart, The communication support device 100 may further include the position detector 44 that detects a position of each of the plurality of counterparts with respect to the camera 3 based on the captured image. The notification unit 10 may further notify the user 90 of the position of at least one of the plurality of counterparts detected by the position detector 44 based on the priority.

With this configuration, the user 90 can grasp the positions of the respective counterparts, and can perform smooth communication according to the positions of the respective counterparts when the plurality of counterparts are present.

The communication support device 100 may further include the distance measuring unit 45 that measures a distance between each of the plurality of counterparts and the camera 3 based on the captured image. The priority determination unit 48 may determine the priority further based on the distance measured by the distance measuring unit 45.

With this configuration, the communication support device 100 assigns a higher priority to a closer person, for example, among the plurality of counterparts based on the distance to the camera 3. As a result, the user 90 can smoothly communicate with each of the counterparts according to the distance to each of the counterparts.

In a case where there is no difference between priorities of the plurality of counterparts determined by the priority determination unit 48, the priorities of the plurality of counterparts may be determined based on identifiers assigned in advance to the plurality of counterparts, respectively.

In a case where there is no difference in the priority between the plurality of counterparts, for example, in a case where the priority levels and the distances are the same, the communication support device 100 determines the priority based on the identifier, so that the information can be provided to the user 90 in an organized manner. As a result, the user 90 can receive appropriate information regarding the counterparts in a timely manner, and can smoothly communicate with the counterparts.

The notification unit 10 may notify the user 90 of identification information for identifying a counterpart and information regarding the counterpart different from the identification information, for the counterpart with the N-th priority (Here, N is a positive integer) or lower. In this case, the notification unit 10 does not necessarily notify information regarding a counterpart with the (N+1)th priority or lower.

The user 90 is likely to pass a counterpart during reading if the entire information detected by the communication support device 100 is read. In this case, it is difficult for the user 90 to communicate smoothly with the counterpart. Therefore, the communication support device 100 supports the user 90 to smoothly communicate with the counterpart by omitting the notification of the information regarding the counterpart with the (N+1)th priority or higher.

The notification unit 10 may notify the user 90 of identification information for identifying the most preferred counterpart and information regarding the most preferred counterpart different from the identification information, for the most preferred counterpart with the first priority. In this case, the notification unit 10 may notify the user 90 of identification information for identifying a counterpart, for the counterpart with the M-th priority (here, M is an integer of two or more) or more other than the most preferred counterpart.

With this configuration, the communication support device 100 notifies a large amount of information for the most preferred counterpart, and notifies the identification information for counterparts with the second to M-th priorities. In this manner, the communication support device 100 supports the user 90 to smoothly communicate with a counterpart having a high priority.

The communication support device 100 may further includes the distance measuring unit 45, the expression determination unit 46, and the motion determination unit 47. The distance measuring unit 45 measures a distance between each of the plurality of counterparts and the camera 3 based on the captured image. The expression determination unit 46 determines a facial expression of each of the plurality of counterparts based on the captured image. The motion determination unit 47 determines a motion of each of the plurality of counterparts based on the captured image. The notification unit 10 may notify the user of identification information for identifying a most preferred counterpart by a voice when a first distance between the camera 3 and the most preferred counterpart with the priority being a first priority, measured by the distance measuring unit, is an interaction distance of a first threshold or less. The notification unit 10 may notify the user of the identification information and at least one of facial expression information related to the facial expression determined by the expression determination unit and motion information related to the motion determined by the motion determination unit by a voice when the first distance is longer than the first threshold.

With this configuration, the communication support device 100 can notify at least one of the facial expression information and the motion information is notified, and as much information in addition to the identification information, and notifies as much information as possible to the user 90 when the first distance between the most preferred counterpart and the camera 3 is longer than the first threshold. On the other hand, when the first distance is small, the user 90 is likely to pass the counterpart during reading if the entire information detected by the communication support device 100 is read. In this case, it is difficult for the user 90 to communicate smoothly with the counterpart. Therefore, the communication support device 100 notifies the user 90 of only the identification information when the first distance between the most preferred counterpart and the camera 3 is the first threshold or less. In this manner, the communication support device 100 omits the information to be notified when the distance is short, and supports the user 90 to smoothly communicate with the counterpart.

When the distance measured by the distance measuring unit 45 is the perceptual distance longer than the first threshold and equal to or less than the second threshold, the notification unit 10 may notify the user 90 of the identification information and one of the facial expression information and the motion information. When the distance measured by the distance measuring unit 45 is the observation distance longer than the second threshold, the notification unit 10 may notify the user 90 of the facial expression information, the motion information, and the identification information.

In this manner, the user 90 can communicate smoothly with the counterpart by gradually omitting the information to be notified to the user 90 as the distance between the counterpart and the camera 3 becomes shorter.

When the first distance measured by the distance measuring unit 45 at a timepoint when detection has been performed by the counterpart detector, is the perceptual distance, the notification unit 10 may notify the user 90 of the identification information by the voice, and then, notify the user 90 of one of the facial expression information and the motion information by the voice. Thereafter, when the first distance measured by the distance measuring unit 45 is the perceptual distance, the notification unit 10 may notify the user 90 of the other of the facial expression information and the motion information by the voice.

With this configuration, even in the case where the counterpart has been detected for the first time at the perceptual distance, the user 90 can know both the facial expression information and the motion information when the counterpart stays at the perceptual distance without approaching the interaction distance. In this manner, the user 90 can smoothly communicate with the counterpart by receiving sufficient information according to the situation.

The notification unit 10 may further include the vibration unit 2 that notifies the user 90 of a detection result obtained by the distance measuring unit 45 by the vibration. The vibration unit 2 may change at least one of the vibration pattern and the magnitude according to the distance between the counterpart and the camera 3 detected by the distance measuring unit 45.

The vibration unit 2 enables the communication support device 100 to notify the user 90 of a part or whole of the detection result in a shorter time as compared with the voice notification. In addition, when the voice notification and the vibration notification are combined, the communication support device 100 can convey a large amount of information to the user 90 in a shorter time as compared with a case where only the voice notification is used.

The camera 3 may acquire a plurality of captured images by capturing an image of the surrounding environment of the user 90 in a time-series manner. In this case, the communication support device 100 may further include the counterpart tracker 43 that tracks the counterpart detected by the counterpart detector 42 in the plurality of captured images. The vibration unit 2 may include two or more vibrating elements that can vibrate. In this case, the vibration unit 2 may cause the respective vibrating elements to sequentially vibrate in a predetermined order when the distance between the counterpart and the camera 3 detected by the distance measuring unit 45 is a predetermined feedback distance in the case where the counterpart tracker 43 tracks the counterpart. In the case where it is difficult for the counterpart tracker 43 to track the counterpart that has been tracked, the vibration unit 2 may cause the respective vibrating elements to sequentially vibrate in an order different from the predetermined order.

When vibration patterns in which the two or more vibrating elements vibrate in different orders are provided, the communication support device 100 can notify the user 90 of various types of information by vibrations. The user 90 can recognize that the distance to the counterpart is the feedback distance and a difference between the possibility of communication and the difficulty in tracking the counterpart that has been tracking based on a difference in the vibration pattern.

The vibrating elements may be three or more vibrating elements which are regularly arranged. The vibration unit 2 may cause the respective vibrating elements to sequentially vibrate in an arranged order when the distance between the counterpart and the camera 3 detected by the distance measuring unit 45 is the feedback distance in the case where the counterpart tracker 43 tracks the counterpart. When it is difficult for the counterpart tracker 43 to track the counterpart that has been tracked, the respective vibrating elements may be made to sequentially vibrate in a reverse order of the arranged order.

When vibration patterns in which the three or more vibrating elements vibrate in different orders are provided, the user 90 can more clearly distinguish and recognize a difference in the information notified by the vibration as compared with the case where there are only two vibrating elements or less.

The communication support device 100 may further include the position detector 44 that detects the position of the counterpart with respect to the camera 3 based on the captured image. The vibrating elements may include a right vibrating element and a left vibrating element. The vibration unit 2 may cause the right vibrating element to vibrate when the position of the counterpart with respect to the camera 3 detected by the position detector 44 is the right side of the optical axis of the camera 3, and may cause the left vibrating element to vibrate when the position of the counterpart is the left side of the optical axis of the camera 3.

With this configuration, the communication support device 100 can more clearly notify the user 90 of the relative position of the counterpart by the vibration.

6. MODIFICATION

Although the embodiment of the present disclosure has been described in detail as above, the above description is merely an example of the present disclosure in all respects. Various improvements and modifications can be made without departing from the scope of the present disclosure. For example, the following changes can be made. Note that the same reference signs will be used for the same components as those in the above embodiment hereinafter, and the same points as those in the above embodiment will be omitted as appropriate. The following modifications can be combined as appropriate.

Figure 24:
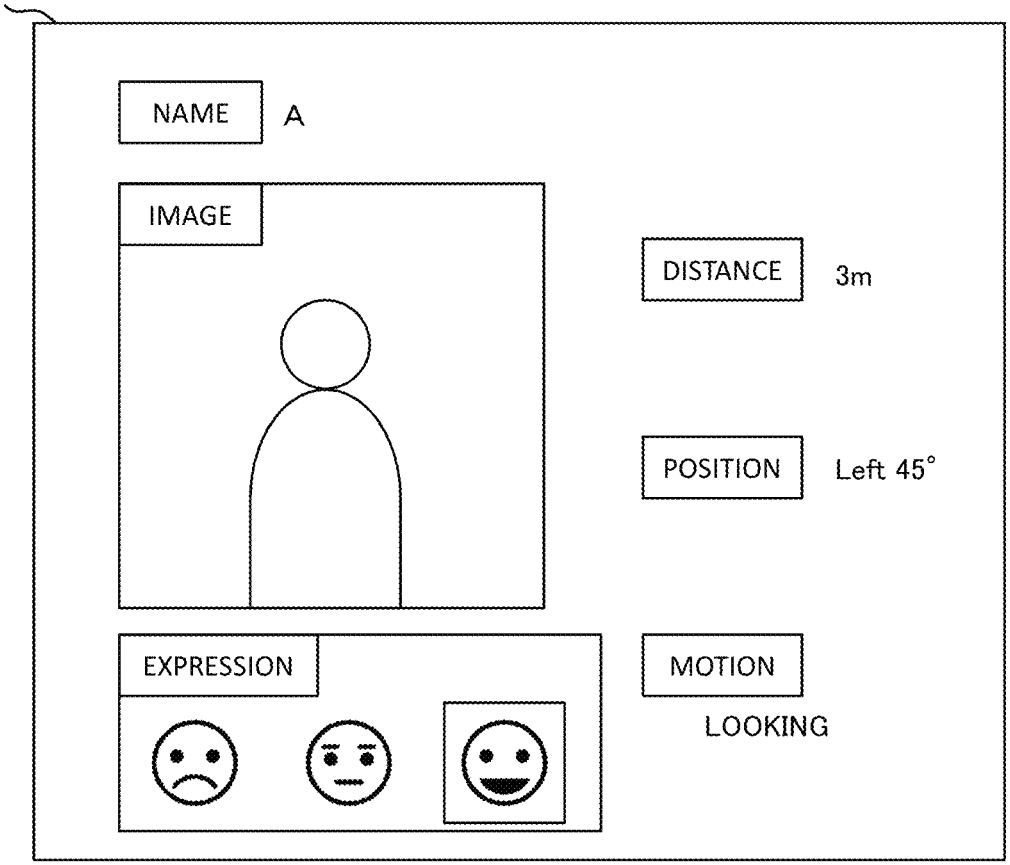
FIG. 24 is a schematic view illustrating a modification of an output aspect of the communication support device according to the embodiment.

FIG. 24 is a schematic view illustrating a modification of an output aspect of the communication support device 100. In the above embodiment, the output aspect of the communication support device 100 that provides communication support to the visually impaired user 90 has been described. As such an output aspect, particularly, the notification unit 10 including the voice output unit 1 that performs voice notification and the vibration unit 2 that performs vibration notification has been described. The output aspect of the present disclosure is not limited to these as long as information can be notified to the user 90. For example, the communication support device 100 may include a display 8 configured to visually notify the user 90.

In the above embodiment, it has been described in Step S105 of FIG. 4 that the counterpart detector 42 detects whether or not the person detected in Step S104 is the counterpart such as an acquaintance. However, the embodiments of the present disclosure are not limited thereto. For example, the counterpart detector 42 may refer to the schedule 54, and detect only a counterpart scheduled to meet if the user 90 has a schedule to meet the specific counterpart. In this case, the counterpart detector 42 does not necessarily detect another counterpart who is not scheduled to meet. As a result, it is possible to prevent a heavy processing load from being applied to the controller 4 in order to detect all the counterparts.

What is claimed is:

1. A communication support device comprising:
an imaging unit that captures an image of a surrounding environment of a user to acquire a captured image;
a counterpart detector that detects a plurality of predetermined counterparts in the captured image;
a priority level setting unit that sets priority levels respectively for the plurality of counterparts based on a predetermined relationship between the user and each of the plurality of counterparts;
a priority determination unit that determines priorities of the plurality of counterparts based on the priority levels;
a notification unit that selects information regarding the plurality of counterparts based on the priorities and notifies the user of the selected information;
a distance measuring unit that measures a distance between each of the plurality of counterparts and the imaging unit based on the captured image;
an expression determination unit that determines a facial expression of each of the plurality of counterparts based on the captured image; and
a motion determination unit that determines a motion of each of the plurality of counterparts based on the captured image,
wherein the notification unit:
notifies the user of identification information for identifying a most preferred counterpart by a voice when a first distance between the imaging unit and the most preferred counterpart with the priority being a first priority, measured by the distance measuring unit, is an interaction distance of a first threshold or less, and
notifies the user of the identification information and at least one of facial expression information related to the facial expression determined by the expression determination unit and motion information related to the motion determined by the motion determination unit by a voice when the first distance is longer than the first threshold.

2. The communication support device according to claim 1, wherein the priority level setting unit refers to a schedule of the user registered in advance, and sets a higher priority level to a counterpart related to the schedule than priority levels of other counterparts.

3. The communication support device according to claim 1, further comprising
a position detector that detects a position of each of the plurality of counterparts with respect to the imaging unit based on the captured image,
wherein the notification unit further notifies the user of a position of at least one of the plurality of counterparts detected by the position detector based on the priority.

4. The communication support device according to claim 1, further comprising
a distance measuring unit that measures a distance between each of the plurality of counterparts and the imaging unit based on the captured image,
wherein the priority determination unit determines the priority further based on the distance measured by the distance measuring unit.

5. The communication support device according to claim 1, wherein
when there is no difference between the priorities of the plurality of counterparts determined by the priority determination unit, the priorities of the plurality of counterparts are determined based on an identifier assigned in advance to each of the plurality of counterparts.

6. The communication support device according to claim 1, wherein
for a counterpart with the priority being an N-th priority (here, N is a positive integer) or lower, the notification unit notifies the user of identification information for identifying the counterpart and information regarding the counterpart different from the identification information, and does not notify the user of information regarding a counterpart with the priority being an (N+1)th priority or higher.

7. The communication support device according to claim 1, wherein
for a most preferred counterpart with the priority being a first priority, the notification unit notifies the user of identification information for identifying the most preferred counterpart and information regarding the most preferred counterpart different from the identification information, and notifies the user of identification information for identifying a counterpart for the counterpart with the priority being an M-th priority (here, M is an integer of two or more) or higher other than the most preferred counterpart.

8. The communication support device according to claim 1, wherein
the notification unit notifies the user of the identification information and one of the facial expression information and the motion information when the first distance measured by the distance measuring unit is a perceptual distance longer than the first threshold and equal to or less than a second threshold, and notifies the user of the facial expression information, the motion information, and the identification information when the first distance measured by the distance measuring unit is an observation distance longer than the second threshold.

9. The communication support device according to claim 8, wherein
the notification unit notifies the user of one of the facial expression information and the motion information by a voice after notifying the user of the identification information by a voice when the first distance, measured by the distance measuring unit at a timepoint when detection has been performed by the counterpart detector, is the perceptual distance, and then, notifies the user of the other of the facial expression information and the motion information by a voice when the first distance measured by the distance measuring unit is the perceptual distance.

10. The communication support device according to claim 1, wherein
the notification unit further includes a vibration unit that notifies the user of a detection result obtained by the distance measuring unit by a vibration, and
the vibration unit changes at least one of a pattern and a magnitude of the vibration according to the distance between the counterpart and the imaging unit detected by the distance measuring unit.

11. The communication support device according to claim 10, wherein the imaging unit captures images of the surrounding environment of the user in a time-series manner to acquire a plurality of captured images, the communication support device further comprising a counterpart tracker that tracks each of the plurality of counterparts detected by the counterpart detector in the plurality of captured images, the vibration unit includes two or more vibrating elements capable of vibrating, and the vibration unit causes, a plurality of times, the respective vibrating elements to sequentially vibrate in a predetermined order when the distance between the most preferred counterpart and the imaging unit detected by the distance measuring unit is a predetermined feedback distance in a case where the counterpart tracker tracks the plurality of counterparts, and causes the respective vibrating elements to sequentially vibrate in an order different from the predetermined order in a case where it is difficult for the counterpart tracker to track the plurality of counterparts that have been tracked.

12. The communication support device according to claim 11, wherein the vibrating elements are three or more vibrating elements which are regularly arranged, and the vibration unit causes, a plurality of times, the respective vibrating elements to sequentially vibrate in an arranged order when the distance between the most preferred counterpart and the imaging unit detected by the distance measuring unit is the feedback distance in the case where the counterpart tracker tracks the plurality of counterparts, and causes the respective vibrating elements to sequentially vibrate in a reverse order of the arranged order in the case where it is difficult for the counterpart tracker to track the plurality of counterparts that have been tracked.

13. The communication support device according to claim 11, further comprising a position detector that detects a position of each of the plurality of counterparts with respect to the imaging unit based on the captured image, wherein the vibrating elements include a right vibrating element and a left vibrating element, and the vibration unit causes the right vibrating element to vibrate when the position of the most preferred counterpart with respect to the imaging unit detected by the position detector is a right side of an optical axis of the imaging unit, and causes the left vibrating element to vibrate when the position of the most preferred counterpart is a left side of the optical axis of the imaging unit.

14. A communication support method comprising:

causing an imaging unit to capture an image of a surrounding environment of a user to acquire a captured image;

causing a counterpart detector to detect a plurality of predetermined counterparts in the captured image;

causing a priority level setting unit to set priority levels respectively for the plurality of counterparts based on a predetermined relationship between the user and each of the plurality of counterparts;

causing a priority determination unit to determine priorities of the plurality of counterparts based on the priority levels;

causing a distance measuring unit to measure a distance between each of the plurality of counterparts and the imaging unit based on the captured image;

causing an expression determination unit to determine a facial expression of each of the plurality of counterparts based on the captured image; and causing a motion determination unit to determine a motion of each of the plurality of counterparts based on the captured image, wherein the method comprises:

causing the notification unit to notify the user of identification information for identifying a most preferred counterpart by a voice when a first distance between the imaging unit and the most preferred counterpart with the priority being a first priority, measured by the distance measuring unit, is an interaction distance of a first threshold or less; or causing the notification unit to notify the user of the identification information and at least one of facial expression information related to the facial expression determined by the expression determination unit and motion information related to the motion determined by the motion determination unit by a voice when the first distance is longer than the first threshold.

15. A non-transitory computer-readable storage medium including a program for causing a computer to execute the communication support method according to claim 14.

* * * * *